US012398852B2

(12) United States Patent
Yeo et al.

(10) Patent No.: US 12,398,852 B2
(45) Date of Patent: Aug. 26, 2025

(54) EDGELIT LIGHTING ASSEMBLY WITH ADJUSTABLE LIGHT DISTRIBUTION

(71) Applicant: Fusion Optix, Inc., Woburn, MA (US)

(72) Inventors: Terence Yeo, Concord, MA (US); John Montminy, Pelham, NH (US); Lee Mantha, Lawrence, MA (US); Michael Demas, Charlestown, MA (US); Timothy Kelly, Brookline, MA (US)

(73) Assignee: Fusion Optix, Inc., Woburn, MA (US)

( * ) Notice: Subject to any disclaimer, the term of this patent is extended or adjusted under 35 U.S.C. 154(b) by 0 days.

(21) Appl. No.: 18/587,770

(22) Filed: Feb. 26, 2024

(65) Prior Publication Data

US 2024/0200739 A1 Jun. 20, 2024

Related U.S. Application Data

(63) Continuation of application No. 17/873,719, filed on Jul. 26, 2022, now Pat. No. 11,913,613, which is a continuation of application No. 16/904,547, filed on Jun. 17, 2020, now Pat. No. 11,441,749, which is a continuation-in-part of application No. 16/374,848, filed on Apr. 4, 2019, now abandoned.

(60) Provisional application No. 62/862,677, filed on Jun. 17, 2019.

(51) Int. Cl.

| | |
|---|---|
| ***F21V 5/04*** | (2006.01) |
| ***F21S 8/02*** | (2006.01) |
| ***F21S 10/00*** | (2006.01) |
| ***F21V 23/00*** | (2015.01) |
| *F21Y 115/10* | (2016.01) |

(52) U.S. Cl.

CPC ............... *F21S 10/00* (2013.01); *F21S 8/026* (2013.01); *F21V 5/045* (2013.01); *F21V 23/008* (2013.01); *F21Y 2115/10* (2016.08)

(58) Field of Classification Search

CPC ........... G02F 1/133626; G02F 1/33602; G02F 1/133615; G02G 1/133627; F21V 5/045; F21V 5/08; F21V 5/007; F21S 8/046; F21S 8/043

See application file for complete search history.

(56) References Cited

U.S. PATENT DOCUMENTS

| | | | | |
|---|---|---|---|---|
| 5,211,463 | A * | 5/1993 | Kalmanash | G02B 6/0051 362/23.15 |
| 5,982,090 | A * | 11/1999 | Kalmanash | G02B 6/0043 313/493 |
| 6,447,132 | B1 * | 9/2002 | Harter, Jr. | G01D 11/28 345/9 |
| 6,842,204 | B1 * | 1/2005 | Johnson | G02F 1/133615 349/61 |
| 7,303,311 | B2 * | 12/2007 | Shimura | G02B 3/08 362/244 |

(Continued)

*Primary Examiner* — Ismael Negron

(57) ABSTRACT

An edgelit lighting assembly provides two or more adjustable light distributions with two or more electrically addressable light source channels. At least one light source channel inputs into an edge face of a primary transmissive optical element. Specific embodiments include a double edgelit configuration and configurations with both edgelit and direct lit light source channels. An optional auxiliary optical element provides additional light distribution control and improved brightness uniformity and visual appearance.

35 Claims, 29 Drawing Sheets

(56) References Cited

U.S. PATENT DOCUMENTS

| | | | | |
|---|---|---|---|---|
| 7,736,019 | B2 * | 6/2010 | Shimada | F21V 13/02 362/249.14 |
| 7,813,055 | B2 * | 10/2010 | Yasumoto | G02B 3/08 359/742 |
| 8,573,799 | B2 * | 11/2013 | Lee | G02F 1/1336 362/370 |
| 8,820,997 | B2 * | 9/2014 | Minami | G02B 30/30 362/613 |
| 2009/0225531 | A1 * | 9/2009 | Praiswater | G02B 6/0068 362/97.1 |
| 2011/0267382 | A1 * | 11/2011 | Fergason | G09G 3/3406 362/97.1 |
| 2012/0235891 | A1 * | 9/2012 | Nishitani | G02F 1/1323 345/102 |
| 2014/0070724 | A1 * | 3/2014 | Gould | F21S 8/024 362/231 |

* cited by examiner

EDGELIT LIGHTING ASSEMBLY WITH ADJUSTABLE LIGHT DISTRIBUTION

BACKGROUND

The present disclosure relates generally to lighting systems; and more specifically, to a lighting assembly for providing different light distribution patterns in an environment. Furthermore, the present disclosure relates to a system for providing different light distribution patterns in an environment. Moreover, the present disclosure relates to a method for providing different light distribution patterns in an environment.

Generally, lighting devices are utilized in a wide area of applications, such as office workspaces, warehouses, educational institutions, research laboratories, indoor and outdoor living spaces, industrial areas, vehicles and so forth for performing visual tasks. Additionally, lighting devices are also employed for aesthetic purposes in order to provide a visually comforting environment to an individual. Conventionally, lighting systems are affixed in the ceilings, walls and other geometric installations to illuminate an area associated therewith.

However, there are several problems associated with the conventional lighting devices. One of the major problems is that such lighting systems generally use light sources for illumination which are often fixed at a position within or in vicinity of the regions that require lighting thereby. Such lighting systems provide a fixed lighting direction. Further, these lighting systems render a non-uniform distribution of light in the associated region which may lead to visual discomfort. For example, such lighting sources, sometimes, create glare after striking on other surfaces.

To overcome this problem, generally, an environment or workspace is provided with multiple small lighting devices leading to an increase installation and maintenance costs, energy usage, wastage of resources and environmental pollution. Even such conventional lighting systems do not provide much customization options related to possible patterns from the lighting devices catering to the explicit needs of an individual. For example, the conventional lighting devices are not versatile enough to easily adapt according to the tasks being performed by an individual in real-time, the emotional status of an individual and so forth.

Few solutions known in the art require physical movement of the lighting devices in order to change a lighting direction and lighting area associated therewith to adapt to the environment. However, such frequent movement of the existing lighting devices may cause damage such as wear and tear of the existing lighting devices, thereby leading to a decrease in efficiency and life of the lighting device. Furthermore, requirement of frequent movement of the existing lighting devices causes waste of time, discomfort and require extra effort on part of the user thereof.

Therefore, in light of the foregoing discussion, there exists a need to overcome the aforementioned drawbacks associated with the existing lighting devices.

SUMMARY

Disclosed is an optical assembly for providing different adjustable light distribution patterns in an environment. The lighting assembly comprises at least one optical element and two or more light source channels each comprising one or more light sources, each light source channel being both physically separated and electrically adjustable in order to control light input into the optical element and subsequently adjust the light distribution output of the optical assembly.

The present disclosure provides a lighting assembly for providing different light distribution patterns in an environment. The present disclosure also provides a system for providing different light distribution patterns in an environment. Furthermore, the present disclosure further provides a method for providing different light distribution patterns in an environment. The present disclosure seeks to provide a solution to the existing problem of non-uniform distribution of light leading to visual discomfort, non-availability of environment oriented, adaptable lighting systems. Furthermore, the present disclosure seeks to provide a solution to the existing problem wastage of electrical energy due to improper lighting in an environment. An aim of the present disclosure is to provide a solution that overcomes at least partially the problems encountered in prior art, and provides a compact, durable, robust, and interactive lighting assembly for providing different light distribution patterns, a system for providing different light distribution patterns and a method for providing different light distribution patterns Embodiments of the present disclosure substantially eliminate or at least partially address the aforementioned problems in the prior art, and provides an improved lighting assembly to provide different light distribution patterns responsive to the surrounding environment. The present disclosure eliminates wastage of light energy and improves energy efficiency. Furthermore, the lighting assembly disclosed is controllable to customize the lighting in and around the environment.

Additional aspects, advantages, features and objects of the present disclosure would be made apparent from the drawings and the detailed description of the illustrative embodiments construed in conjunction with the appended claims that follow.

It will be appreciated that features of the present disclosure are suitable to being combined in various combinations without departing from the scope of the present disclosure as defined by the appended claims.

BRIEF DESCRIPTION OF FIGURES

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

Figure 1:
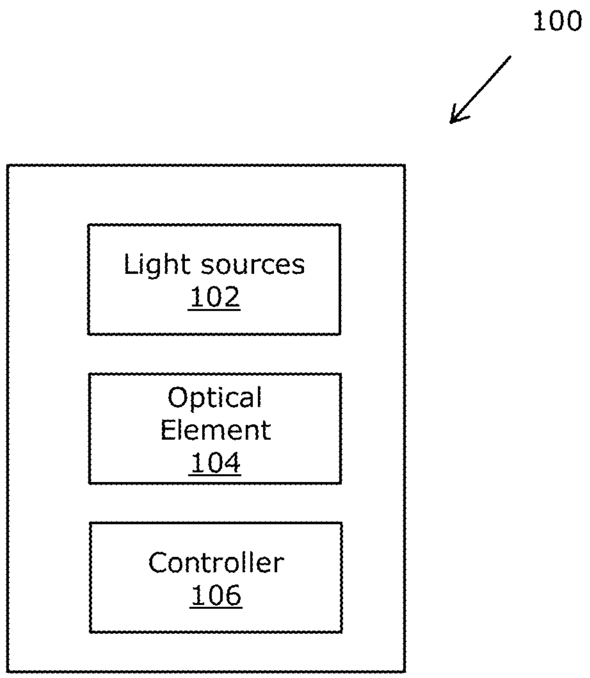

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Figure 2:
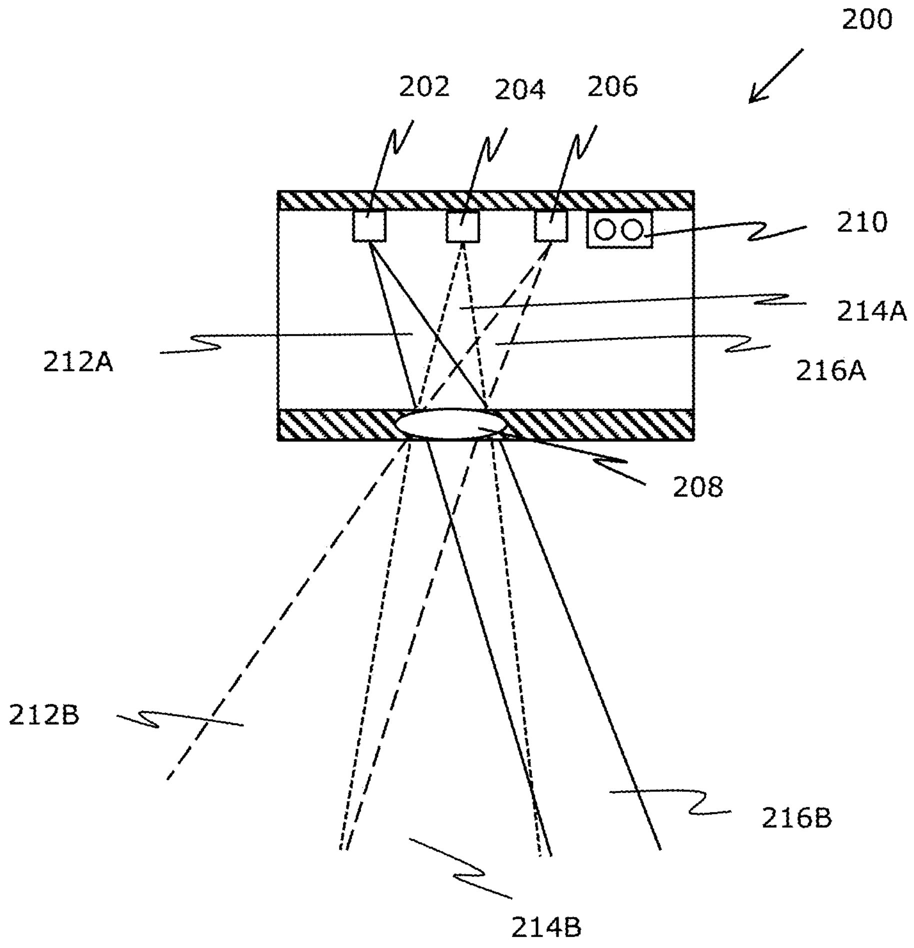
Figure 4:
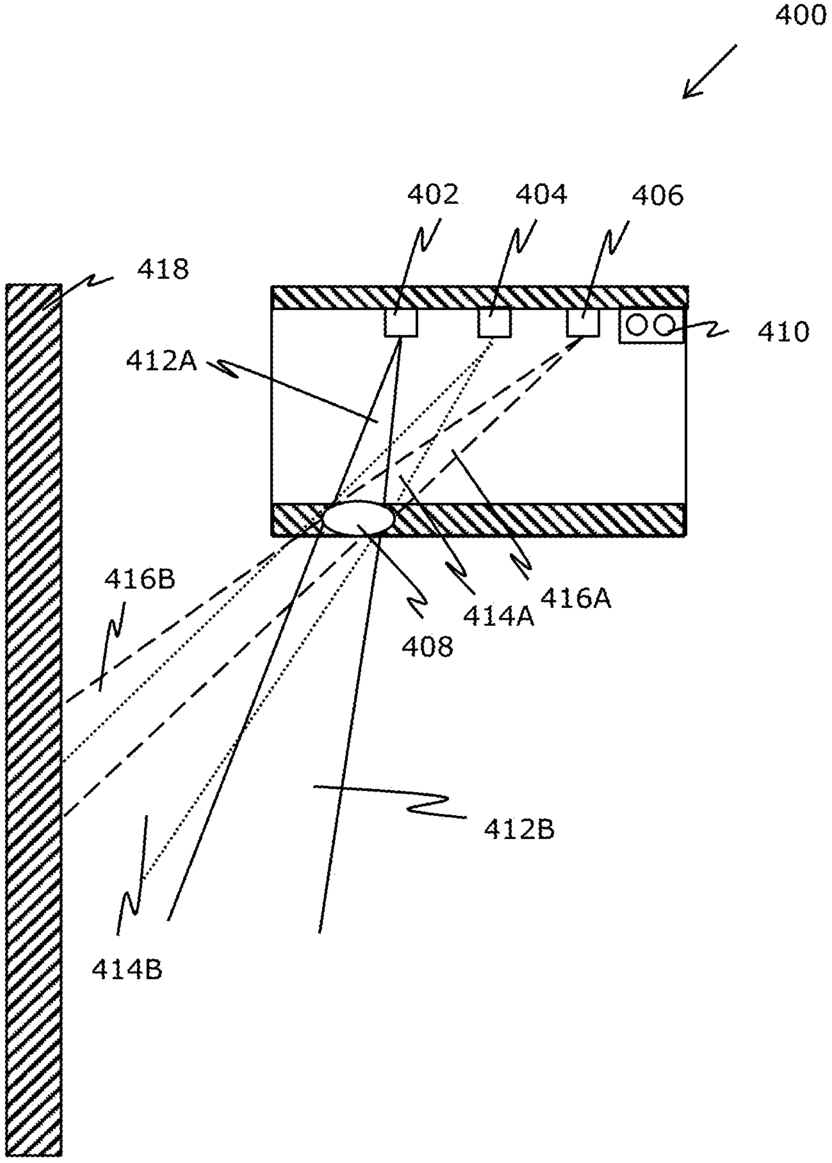
Figure 6:
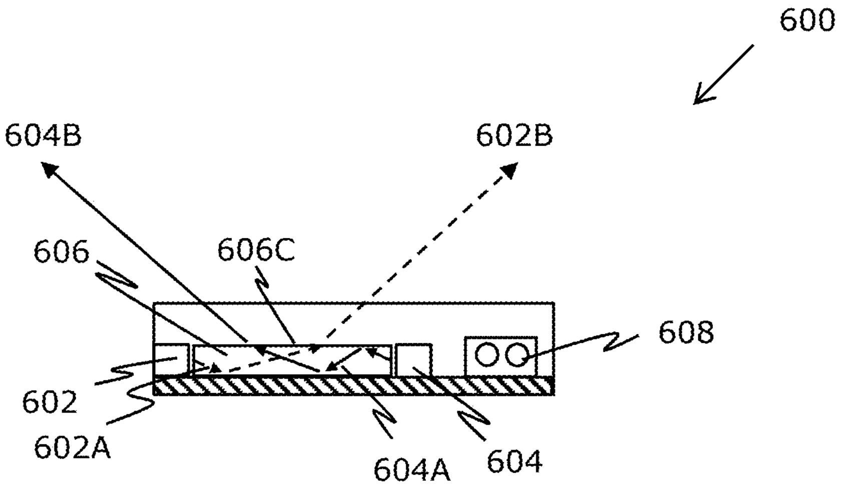
Figure 8:
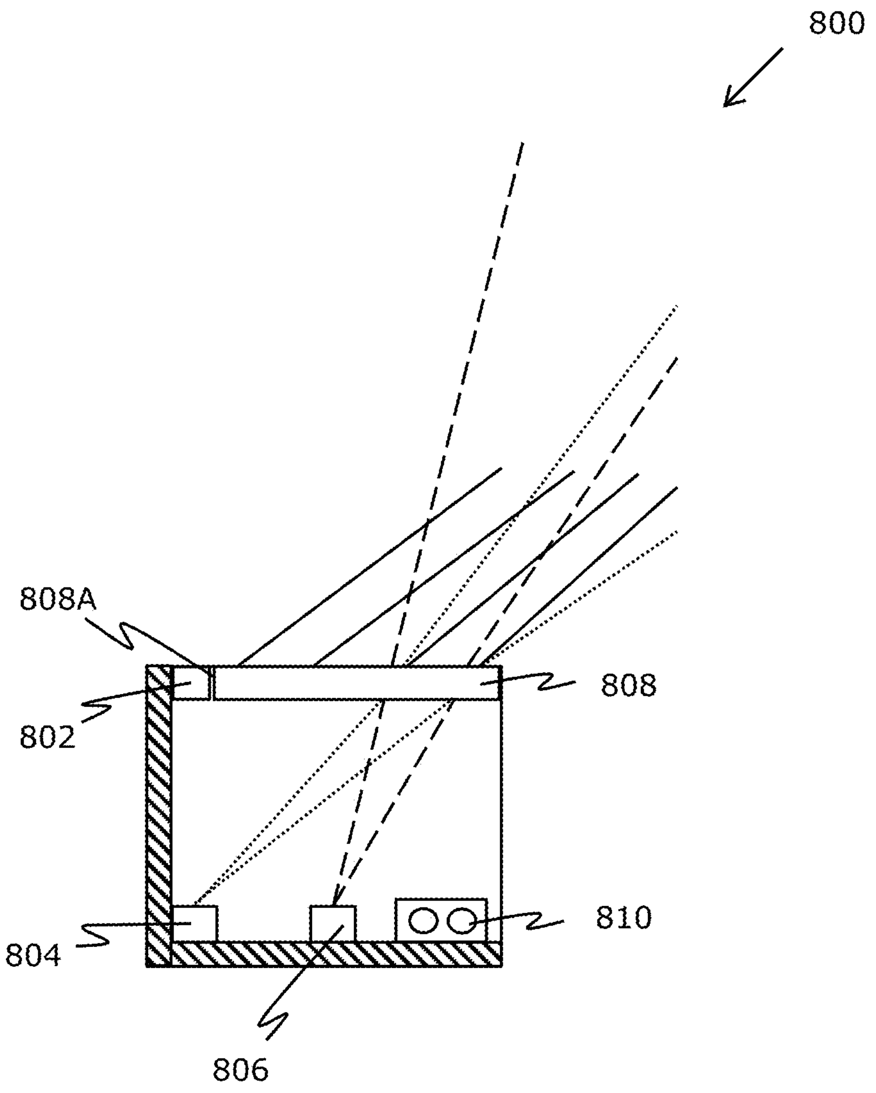
Figure 10:
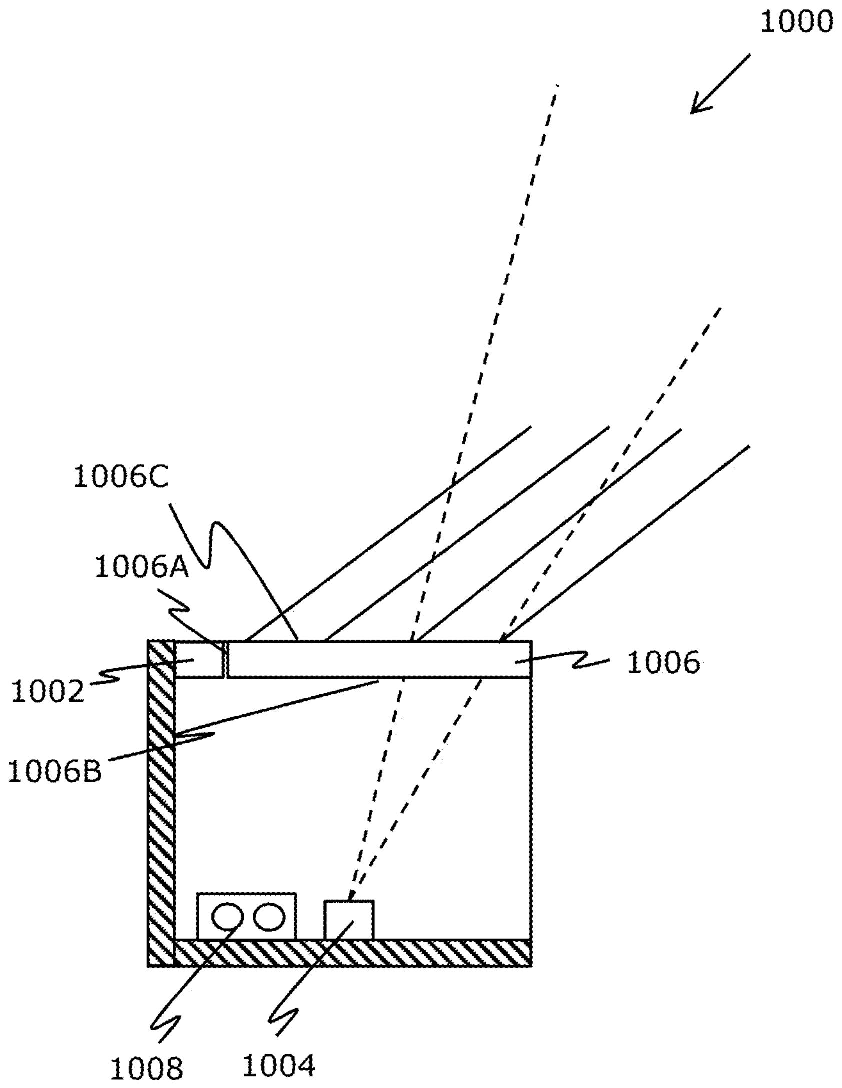
Figure 13:
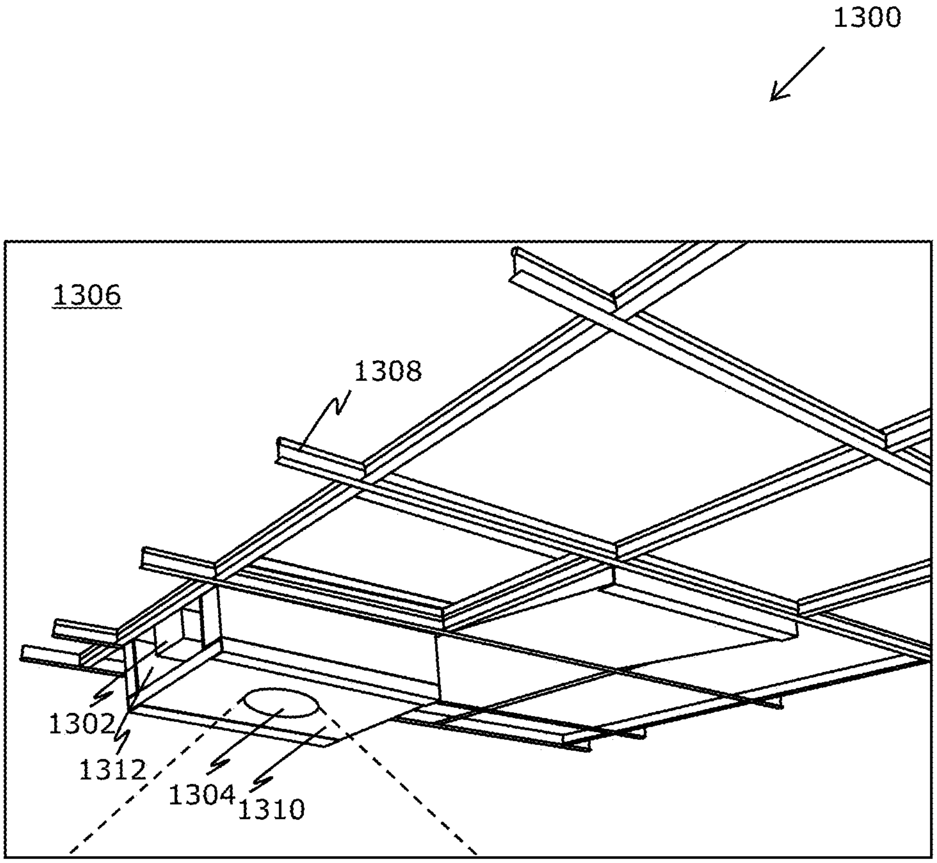
Figure 14:
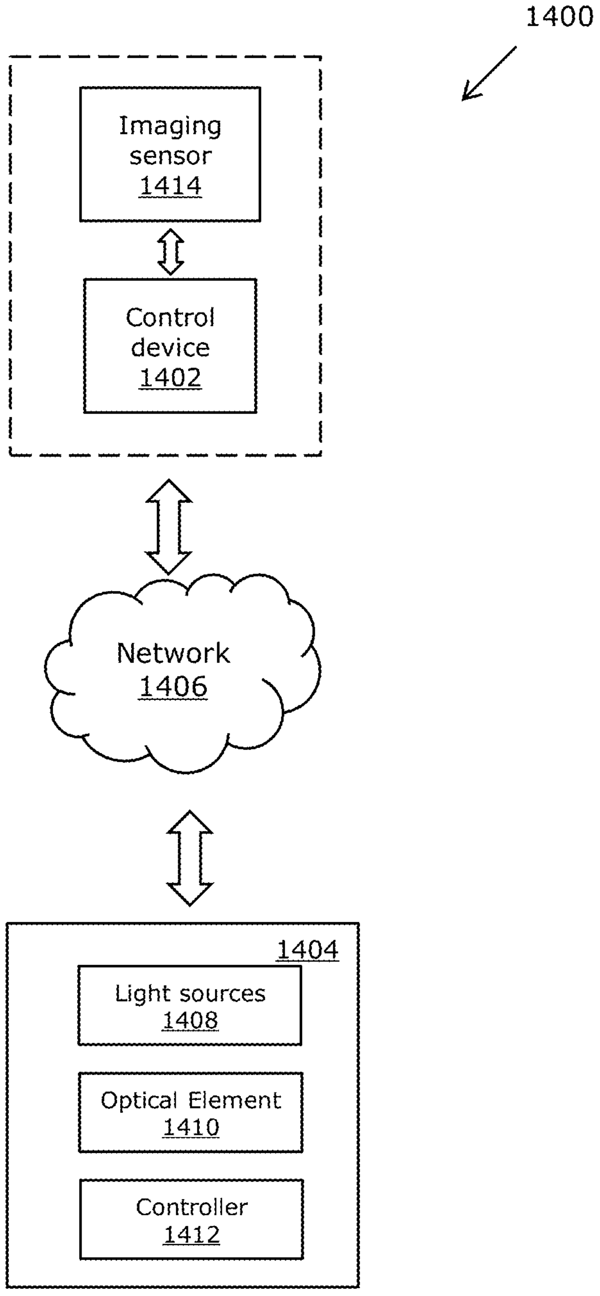
Figure 15:
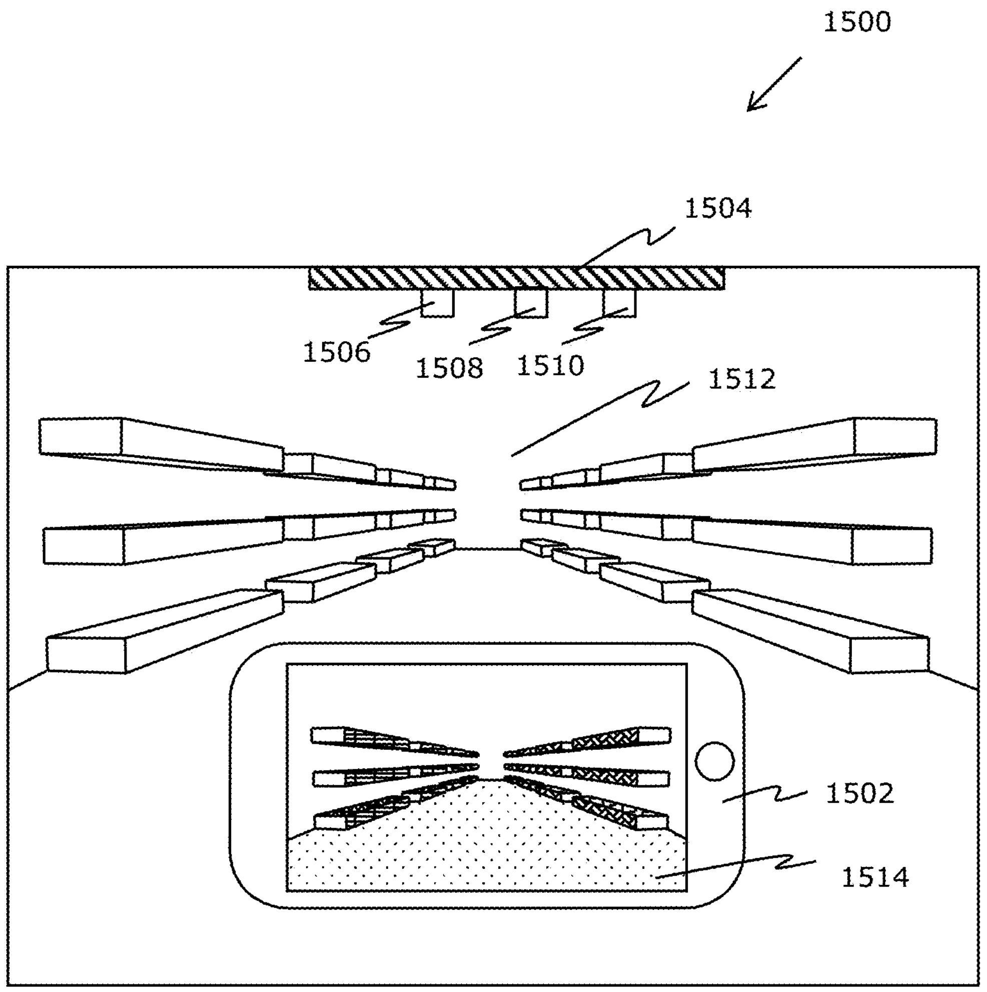
Figure 16:
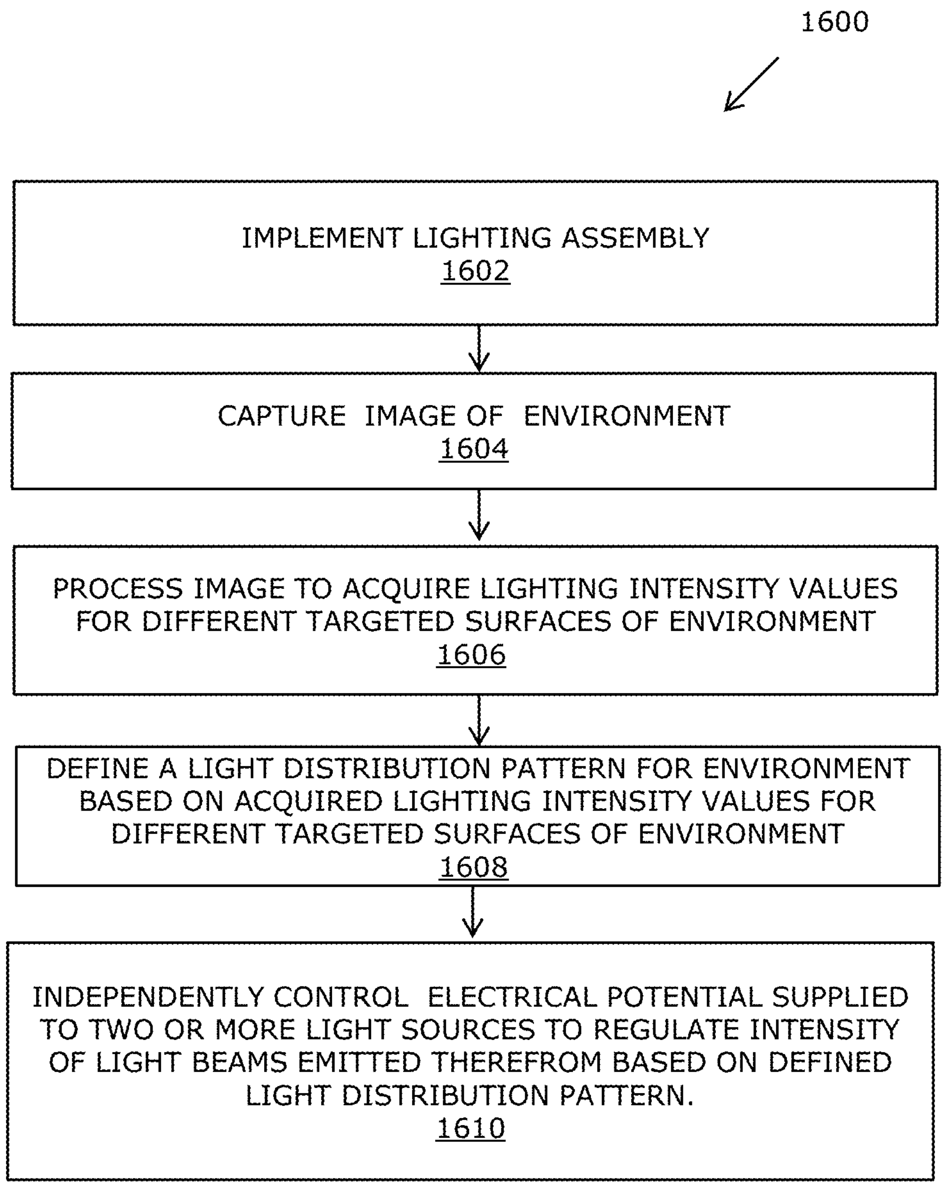

Embodiments of the present disclosure will now be described, by way of example only, with reference to the following diagrams wherein:

FIG. 1 is a block diagram of a lighting assembly for providing different light distribution patterns, in accordance with an embodiment of the present disclosure;

FIG. 2 is a schematic illustration of an exemplary arrangement of a lighting assembly, in accordance with an embodiment of the present disclosure;

FIGS. 3A-3F are schematic illustrations of different light distribution patterns provided by the lighting assembly of FIG. 2, in accordance with various embodiments of the present disclosure;

FIG. 4 is a schematic illustration of an exemplary arrangement of a lighting assembly, in accordance with another embodiment of the present disclosure;

FIGS. 5A-5F are schematic illustrations of different light distribution patterns provided by the lighting assembly of FIG. 4, in accordance with various embodiments of the present disclosure;

FIG. 6 is a schematic illustration of an exemplary arrangement of a lighting assembly, in accordance with yet another embodiment of the present disclosure;

FIGS. 7A-7D are schematic illustrations of different light distribution patterns provided by the lighting assembly of FIG. 6, in accordance with various embodiments of the present disclosure;

FIG. 8 is a schematic illustration of an exemplary arrangement of a lighting assembly, in accordance with still another embodiment of the present disclosure;

FIGS. 9A-9E are schematic illustrations of different light distribution patterns provided by the lighting assembly of FIG. 8, in accordance with various embodiments of the present disclosure;

FIG. 10 is a schematic illustration of an exemplary arrangement of a lighting assembly, in accordance with still another embodiment of the present disclosure;

FIGS. 11A-11D are schematic illustrations of different light distribution patterns provided by the lighting assembly of FIG. 10, in accordance with various embodiments of the present disclosure;

FIGS. 12A-12E are schematic representations of arrangements of lighting assemblies, in accordance with various exemplary embodiments of the present disclosure;

FIG. 13 is a schematic illustration of a lighting assembly arranged in a suspended ceiling, in accordance with an exemplary embodiment of the present disclosure;

FIG. 14 is a schematic illustration of a system for providing different light distribution patterns, in accordance with an embodiment of the present disclosure;

FIG. 15 is a schematic illustration of an exemplary implementation of the system of FIG. 14, in accordance with an embodiment of the present disclosure; and FIG. 16 is a flowchart of a method for providing different light distribution patterns in an environment by implementing a lighting assembly, in accordance with an embodiment of the present disclosure.

Figure 17:
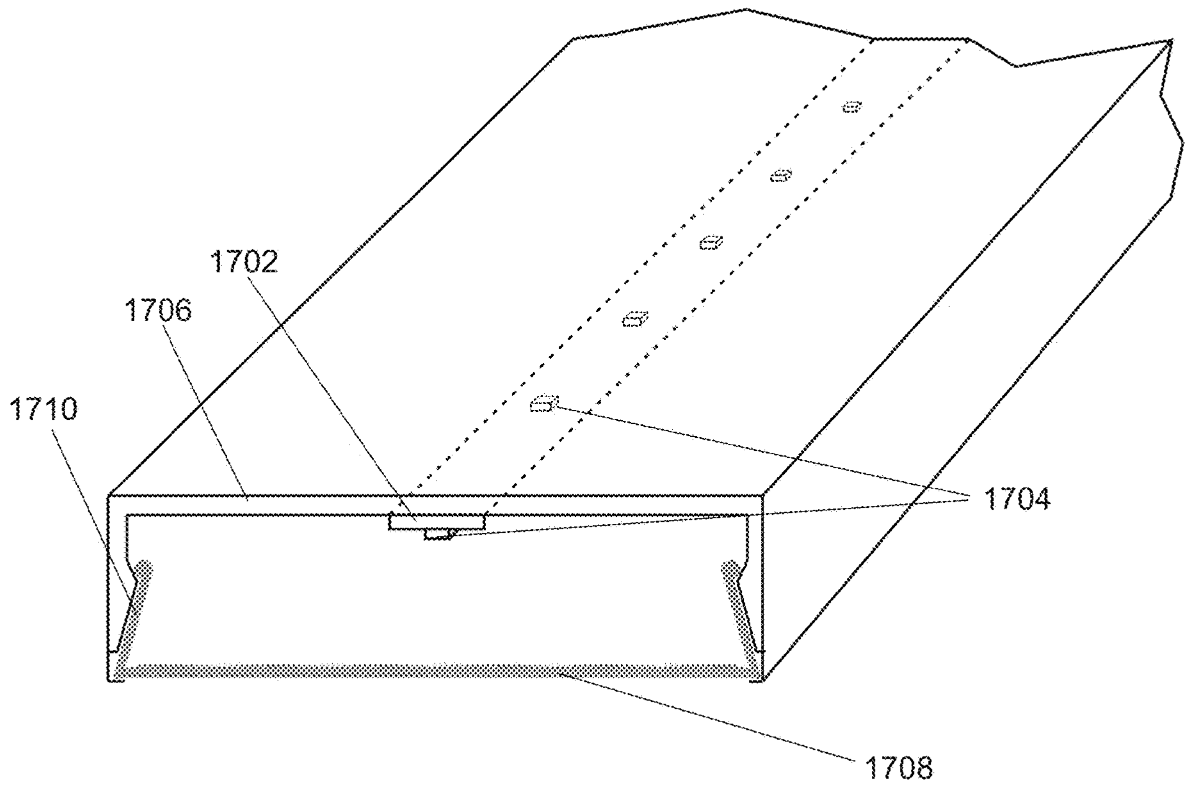

FIG. 17 is a perspective view of a lighting assembly with single light source channel.

Figure 18:
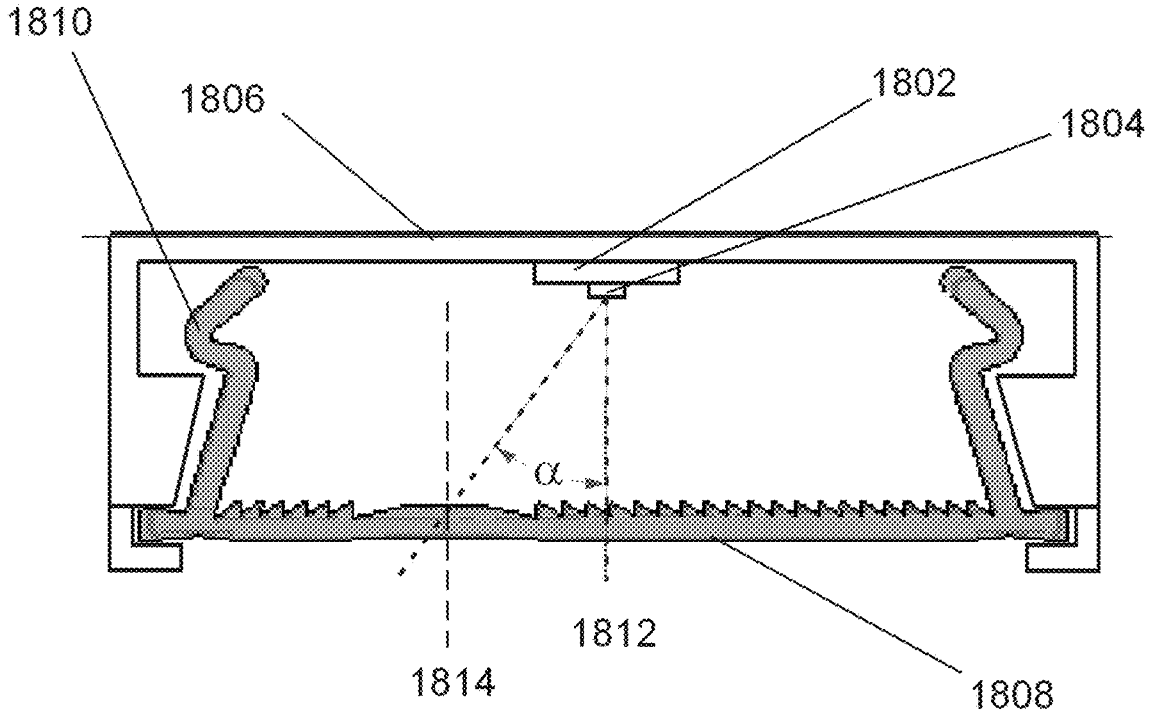

FIG. 18 is a cross-section view of a lighting assembly with a single light source channel and an optical element comprising a Fresnel lens.

Figure 19A:
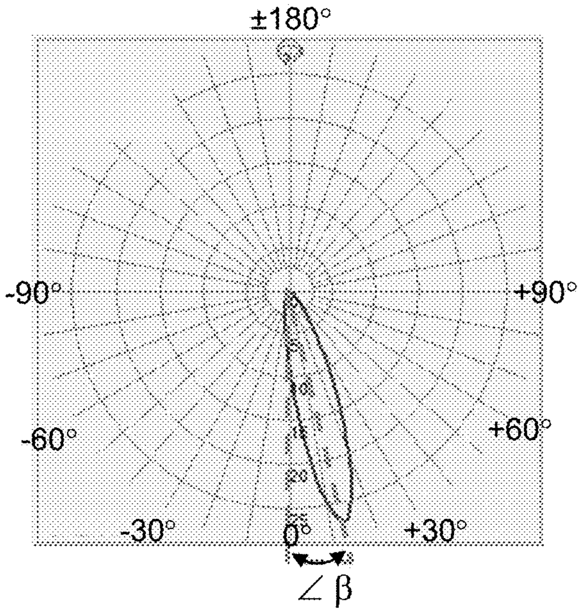
Figure 19B:
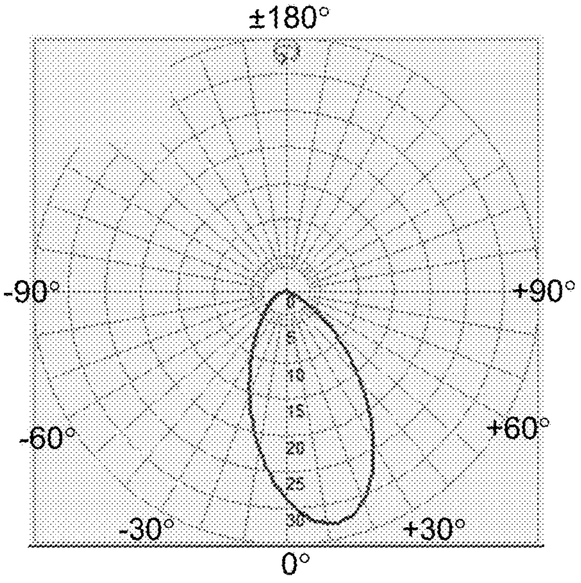

FIG. 19A and FIG. 19B are polar plots from the lighting assembly embodiment of FIG. 18.

Figure 20:
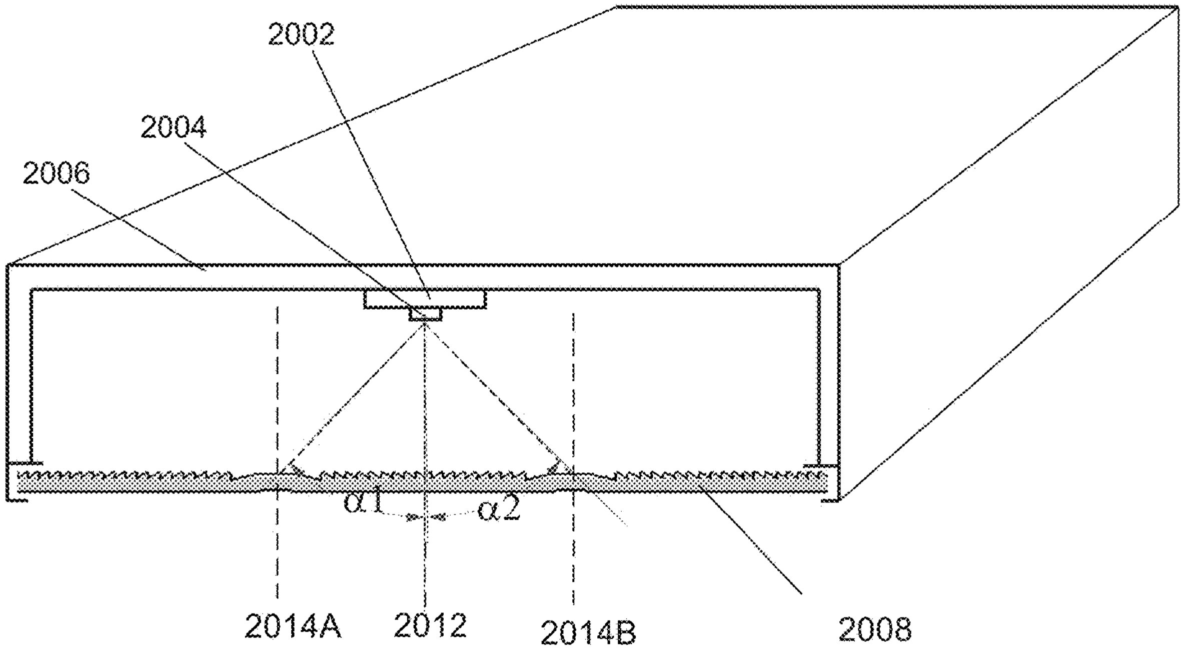

FIG. 20 is a cross-section view of an embodiment lighting assembly having an optical element with two linear Fresnel lenses.

Figure 21:
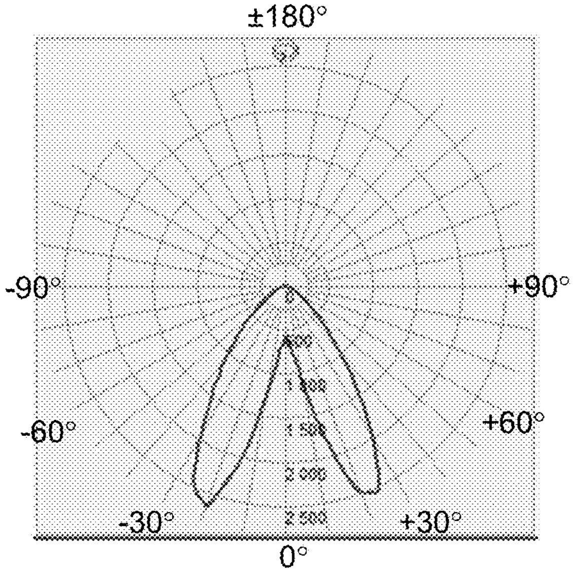

FIG. 21 is a polar plot of the light distribution of the lighting assembly of FIG. 20.

Figure 22:
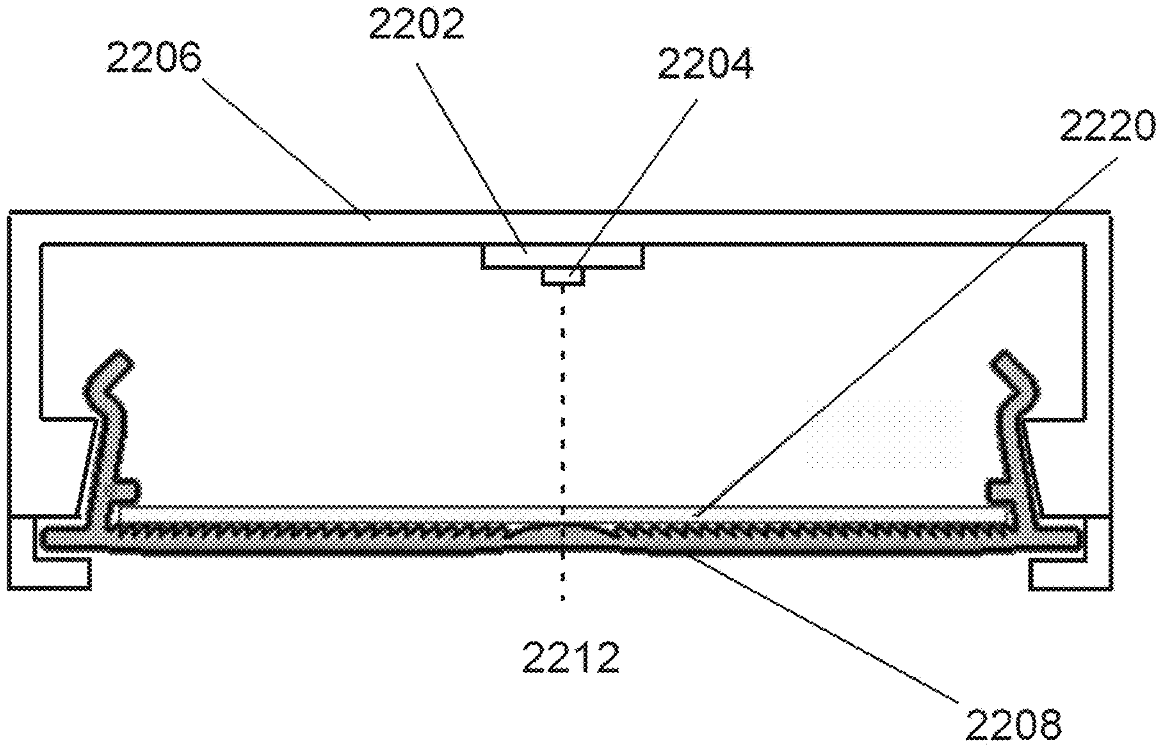

FIG. 22 is a cross-section view of a lighting assembly embodiment having a Fresnel lens and additional diffuser component.

Figure 23A:
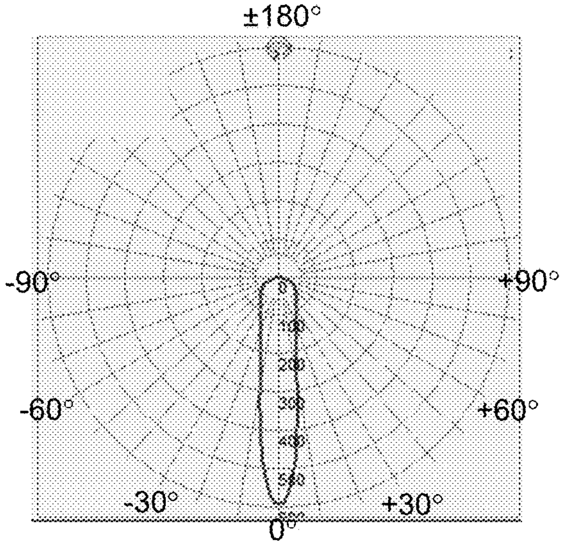
Figure 23B:
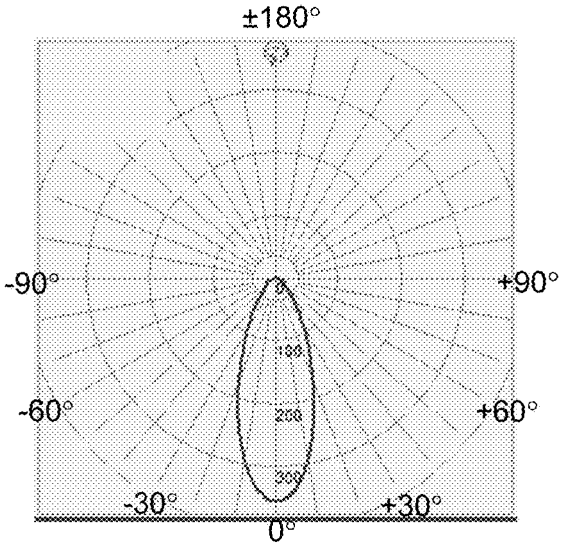

FIG. 23A and FIG. 23B are polar plots of the light distribution of the lighting assembly of FIG. 22 without and with the additional diffuser.

Figure 24A:
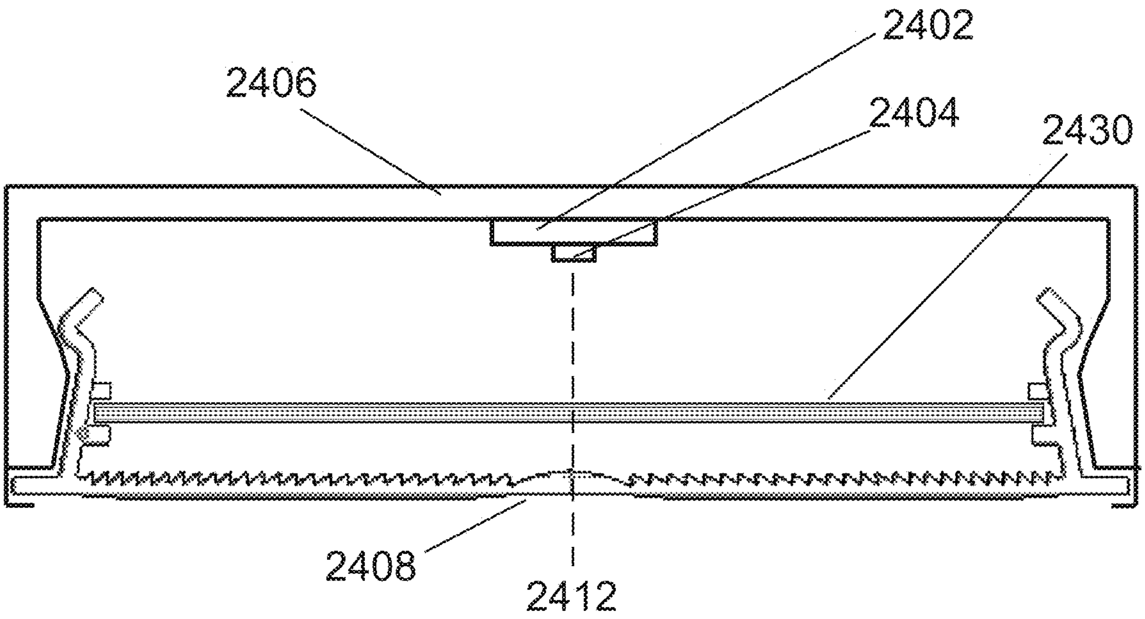

FIG. 24A is cross-section view of a lighting assembly having a Fresnel lens and an additional longitudinal beam spread lens.

Figure 24B:
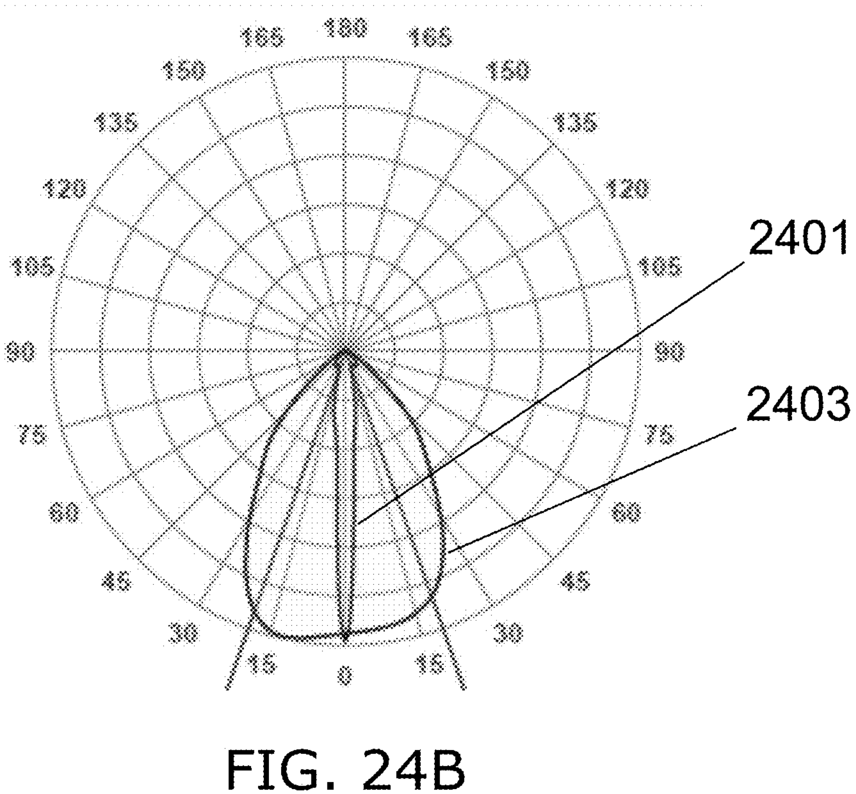

FIG. 24B is a polar plot of light distribution from the lighting assembly embodiment of FIG. 24A showing both transverse and longitudinal axes.

Figure 24C:
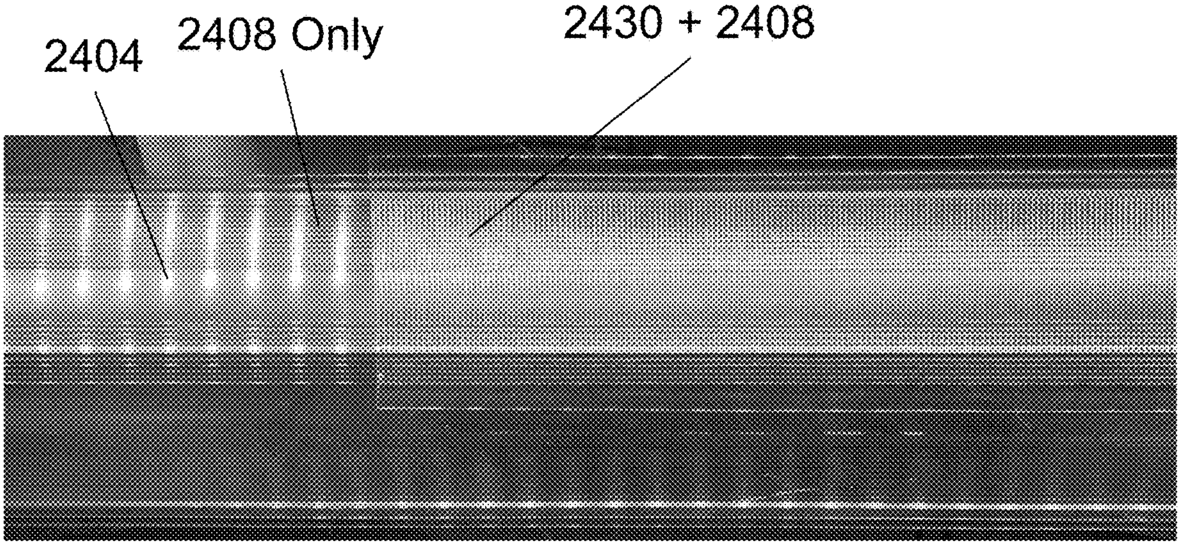

FIG. 24C is a photograph showing the improved uniformity appearance of the lighting assembly embodiment of FIG. 24A.

Figure 25:
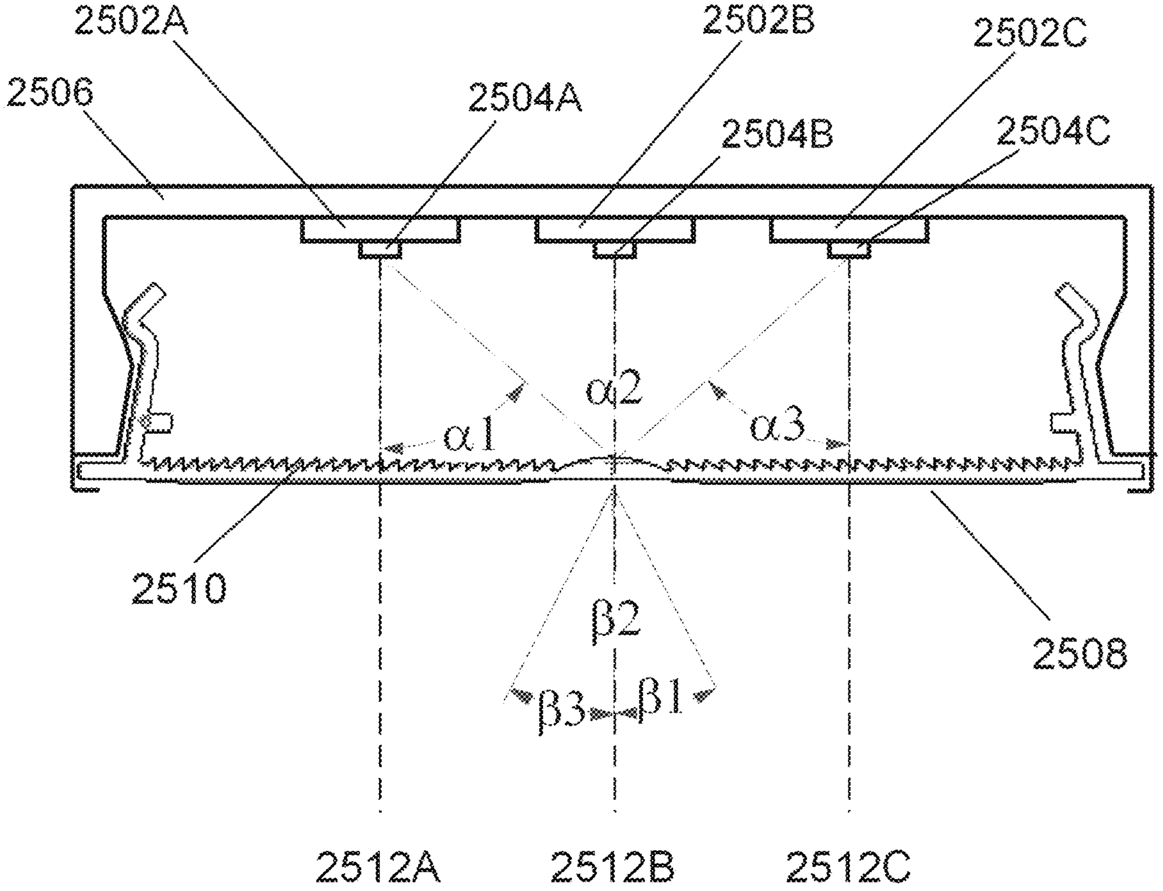

FIG. 25 is a cross-section view of a lighting assembly embodiment with three light source channels and a Fresnel lens.

Figure 26A:
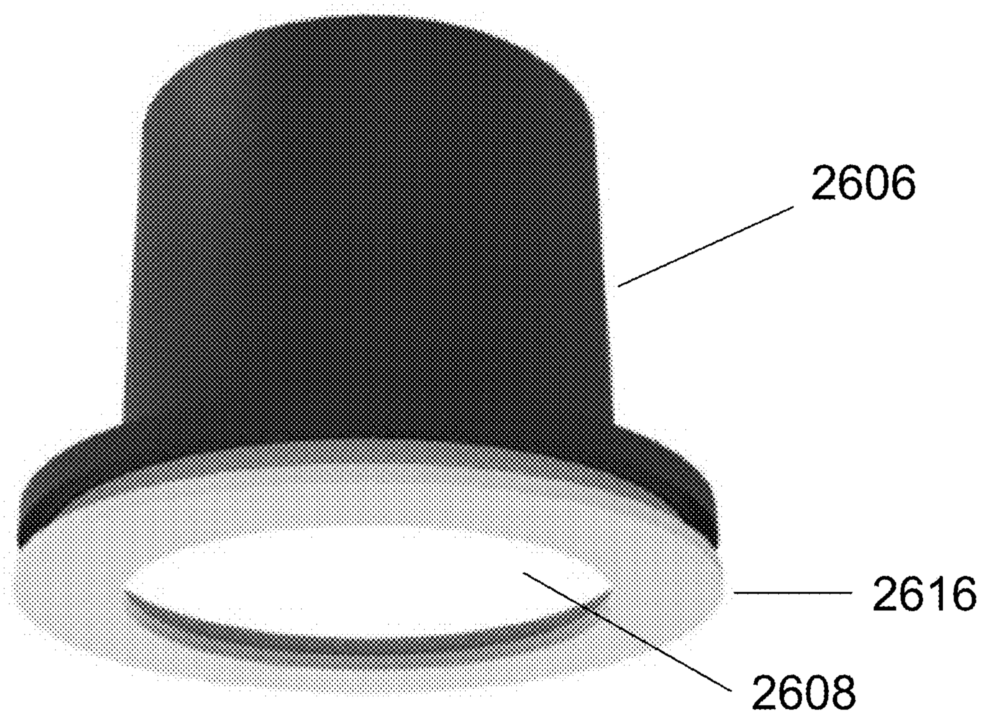

FIG. 26A is a perspective of a round downlight suitable for mounting into a ceiling.

Figure 26B:
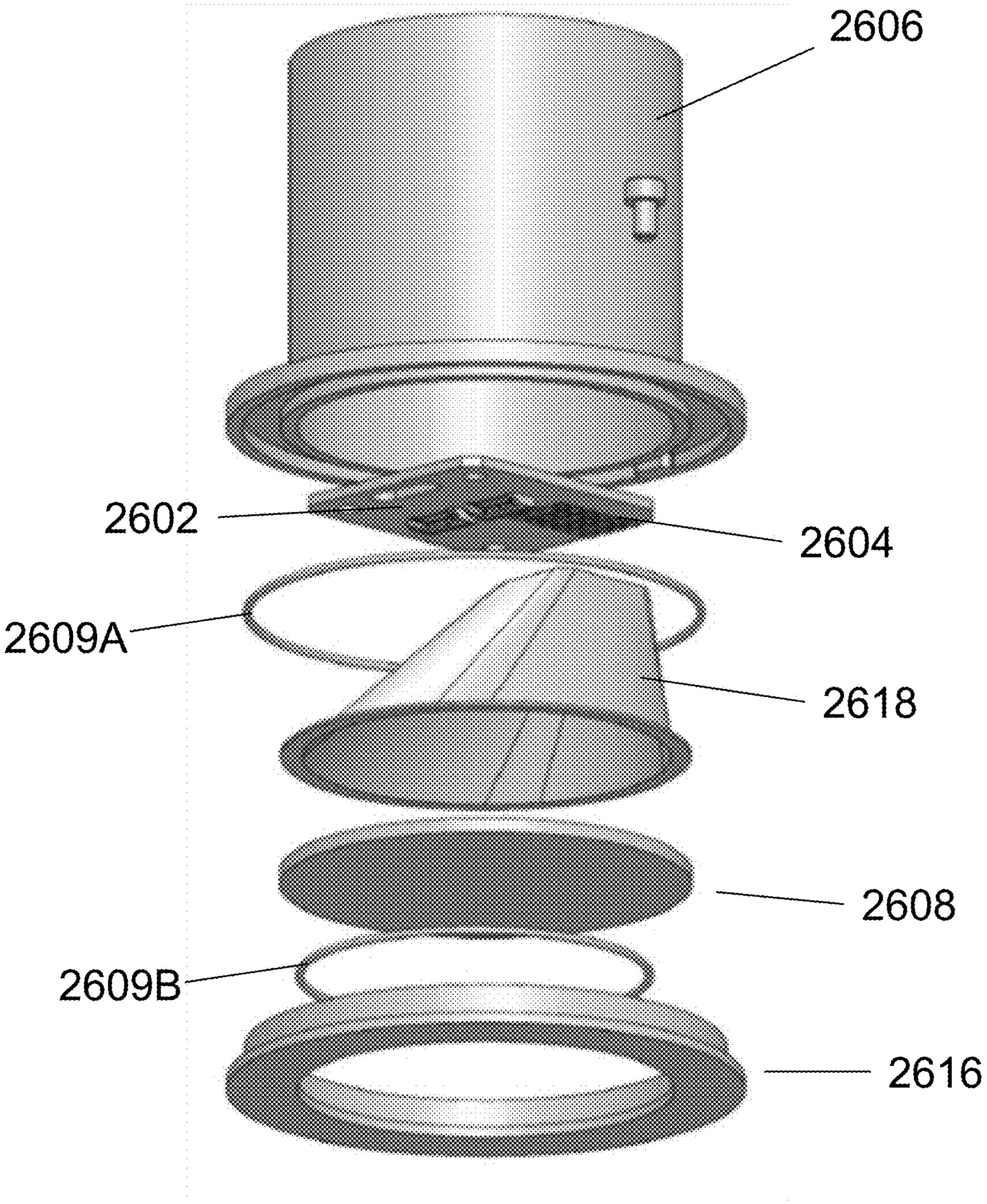

FIG. 26B is an exploded view of the round downlight embodiment of FIG. 26A.

Figure 27A:
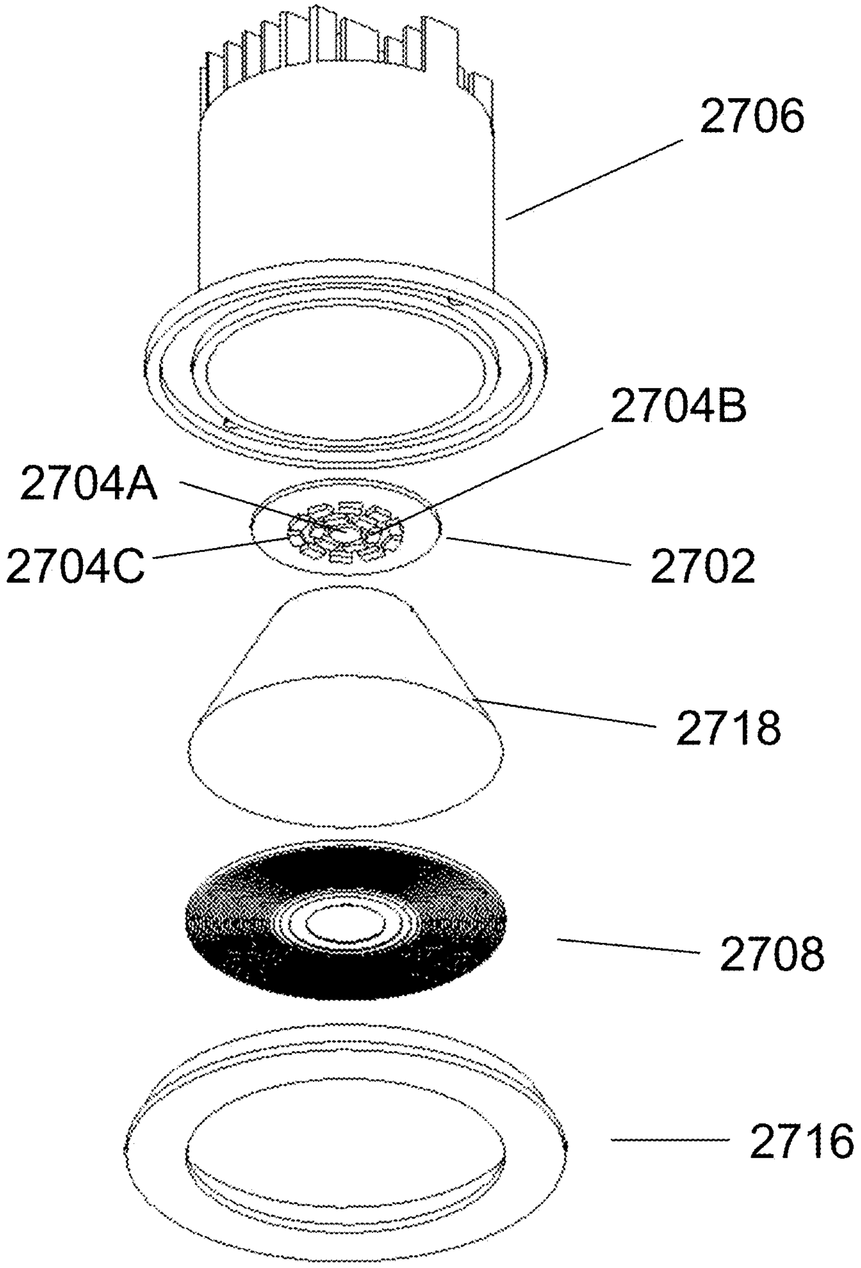
Figure 27B:
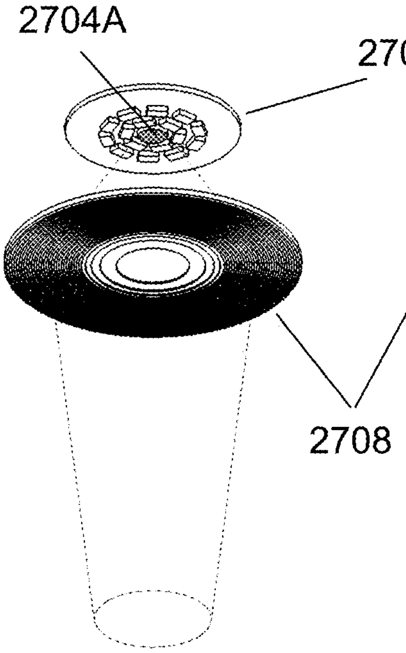
Figure 27C:
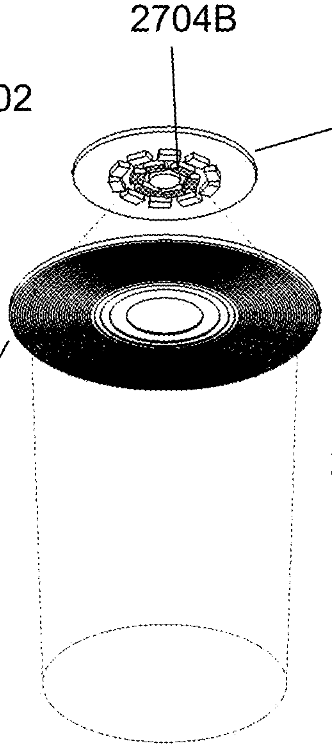
Figure 27D:
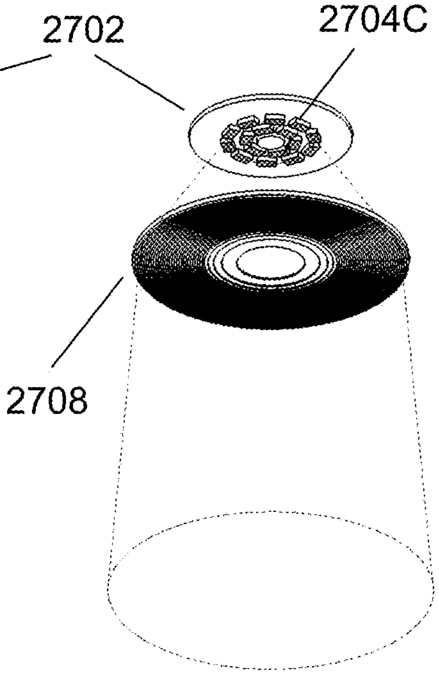

FIG. 27A is an exploded view of a round downlight embodiment. The same lighting assembly embodiment is shown in FIG. 27B, FIG. 27C, and FIG. 27D in perspective views of select internal components.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In overview, embodiments of the present disclosure are concerned with a lighting assembly for providing different light distribution patterns in an environment. Furthermore, embodiments of the present disclosure also provide a system for providing different light distribution patterns in an environment. Additionally, embodiments of the present disclosure provide a computer implemented method for providing different light distribution patterns in an environment by implementing a lighting assembly.

Referring to FIG. 1, illustrated is a schematic representation of a lighting assembly 100 for providing different light distribution patterns in an environment, in accordance with an embodiment of the present disclosure. As shown, the lighting assembly 100 comprises two or more light sources 102, at least one optical element 104 and a controller 106. Each of the two or more light sources 102 is configured to emit a light beam. Each of the two or more light sources 102 is arranged in a manner so as to emit the respective light beams along channels (shown in FIG. 3) different from each other. Notably, the different light sources 102 emit different light beams along different channels. The term "channel" as used herein refers to a path or a pattern followed by the light beam emitted from the light source 102. It will be appreciated that a light beam emitted from one or more light source 102 (such as a multitude of Light Emitting Diodes LEDs) in a definite path or a pattern will also be referred to as a channel. In an example, the light beam of a definite beam spread and a definite beam angle will be referred to as a channel of the light source 102. Optionally, the lighting assembly 100 comprises two or more directional light sources that are aimed at different angles to illuminate different target areas in an environment. Throughout the present disclosure the term "target area" as used herein refers to a portion or area of the surface intended to be illuminated by two or more light sources 102. Optionally, the lighting assembly 100 may be provided with an outer housing or covering to protect its various elements enclosed therein. Alternatively, the two or more light sources 102, the at least one optical element 104 and the controller 106 may be arranged as independent elements in the ceiling, walls or other surfaces where the lighting assembly 100 is installed.

The term "lighting assembly" 100 as used herein may generally relate to any lighting assembly 100 for use both in general and specialty lighting. The term general lighting includes use in living spaces such as lighting in industrial, commercial, residential and transportation vehicle applications. The term specialty lighting includes emergency lighting activated during power failures, fires or smoke accumulations in buildings, microscope, stage illuminators, and billboard front-lighting, hazardous and difficult access location lighting, backlighting for signs, agricultural lighting and so forth.

Throughout the present disclosure, the term "light sources" 102 is used to refer to any electrical device capable of receiving an electrical signal and producing electromagnetic radiation or light in response to the signal. The light sources 102 may be configured to generate electromagnetic radiation within the visible spectrum, outside the visible spectrum, or a combination of both. The term "light" is used when the electromagnetic radiation is within the visible ranges of frequency and the term "radiation" is used when the electromagnetic radiation is outside the visible ranges of frequency. Notably, the light sources may be configured for a variety of applications, including, but not limited to, indication, display, and/or illumination. Generally, the light sources 102 are particularly configured to generate radiation or light having a sufficient intensity to effectively illuminate an interior or exterior environment or targeted area. In this context, "sufficient intensity" refers to sufficient radiant power in the visible spectrum generated in the space or environment. The unit "lumens" is often employed to represent the total light output from the light source 102 in all directions, in terms of radiant power or luminous flux. The light sources may use lights of any one or more of a variety of radiating sources, including, but not limited to, Light Emitting Diode LED-based sources (including one or more LEDs), electroluminescent strips, incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources such as, photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers. It will be appreciated that the two or more light sources 102 are employed for providing different light distribution patterns as one light source 102 may not always have the flexibility to provide the correct distribution pattern, such as maintaining correct intensity and color temperature for the lighting over the changing environmental conditions. Notably, two or more differentiated light sources 102 will have an increased operating range, thereby having better possibility of providing the desired light distribution pattern. Optionally, the light sources 102 at a particular aiming may all be one color, say white or may be of different colors which when combined together yield a different colored light distribution pattern. Altering the radiated power of two or more light sources 102 leads to formation of different light distribution patterns in a variety of colors. Optionally, the lighting assembly 100 comprises a power source for providing electrical power to the two or more lighting sources 102.

According to an embodiment, the lighting assembly 100 further comprises at least one driver (not shown) associated with each of the two or more light sources 102, wherein the at least one driver is adapted to be regulated based on the defined light distribution pattern to, thereby, control the electrical potential supplied to the associated light source 102. The term "driver" as used herein refers to any discrete circuitry such as passive or active analog components including resistors, capacitors, inductors, transistors, operational amplifiers, and so forth, as well as discrete digital components such as logic components, shift registers, latches, or any other separately packaged chip or other component for realizing a digital signal. The driver is regulated to control an electrical supply to each of the light sources 102, in order to regulate the intensity and/or color of the light beam associated with one or more of the light sources 102. In an example, the driver associated with each of the light sources 102 is a manual switch. The switch may be operated by the user to achieve a desired light distribution pattern.

According to an embodiment, the at least one optical element 104 is fixedly arranged with respect to the two or more light sources 102 to be disposed along the channels of the emitted light beams therefrom. The at least one optical element 104 is configured to guide the emitted light beams towards two or more distinct optical paths to illuminate different targeted surfaces in the environment. Notably, the light beams emitted from the light sources 102 are incident on the optical element and are further guided by any of the known optical phenomenon such as refraction, reflection, and/or diffraction. Therefore, the light beams when passed through the optical element 104 are guided towards distinct optical paths. It will be appreciated that the direction in which the optical path is directed is based on the characteristic property of the optical element 104 and the directionality of the light sources 102. In an example, a beam angle and a beam spread of the optical path will depend on the characteristic property of the optical element 104. The optical elements 104 include, but are not limited to a collimating lens, a refractive lens, a light guide, a diffuser and a reflector. It will be appreciated that the characteristics of the optical path followed by the light beam depends on one or more of the types of the optical element 104 employed, distance of the optical element 104 from the light sources 102, the inherent properties of the optical element 104 such as the refractive index and so forth. The design and type of optical element 104 employed for a particular lighting assembly ensures generation of concentrated light beams leading to effective utilization. In other words, the optical elements 104 ensure that most of the light energy generated by the light sources 102 is effectively used to generate the light distribution pattern as desired. In an example, the optical element 104 is a collimating lens that is configured to generate a light beam of most of light flux that is incident on one face of the collimating lens into a parallel beam with a minimum spill outside the beam. In another example, the optical element 104 is a light guide. The light guide provides a larger surface for emitted light, i.e. increasing the beam width of the emitted light which reduces the glare while maintaining directionality. Optionally, the optical elements 104 also define the shape of the output beam of the light sources. In an example, the optical element 104 may produce light of varied patterns, such as round, rectangular, batwing, oval and the like.

Throughout the present disclosure, the term "light distribution pattern" refers to the visual patterns of light from a light source 102 distributed over a spatial area. The light distribution pattern is the visual characteristic property of the light beam emitted from the two or more light sources 102. The properties that define the representation of a light may include intensity, spectral distribution, spatial distribution, chromaticity, color temperature and the like. The light distribution pattern may be distributed over a range of angles. It will be appreciated that the light distribution pattern of a particular light source 102 is based on one or more properties of the light source 102, optical element 104, the distance between the light source 102 and the optical element 104, the electrical potential supplied and so forth. The different light distribution patterns may generally include wall washing, cove lighting, task lighting, ambient lighting and accent lighting. It will be appreciated that a property of any of the light distribution pattern may be altered to produce a different light distribution pattern.

The term "spectrum" or "color" as used herein refers to one or more frequencies (or wavelengths) of radiation produced by the two or more light sources 102. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It will be appreciated that a given spectrum may be the result of a mixing of two or more other spectra (e.g., mixing radiation respectively emitted from multiple light sources). Additionally, the term "colors" implicitly refers to multiple spectra having different wavelength components and/or bandwidths. It also should be appreciated that the term color may be used in connection with both white and non-white light.

The term "color temperature" as used herein generally refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample under analysis. The black body radiator color temperatures generally fall within a range of from approximately 700 degrees K (typically considered the first visible to the human eye) to over 10,000 degrees K; white light generally is perceived at color temperatures above 1500-2000 degrees K. Furthermore, lower color temperatures generally indicate white light having a more significant red component or a warmer feel, while higher color temperatures generally indicate white light having a more significant blue component or a cooler feel. In an example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K.

According to an embodiment, the controller 106 operatively coupled to the two or more light sources 102. The controller 104 is configured to independently control electrical potential supplied to the two or more light sources 102 to regulate an intensity of the light beams emitted therefrom based on a defined light distribution pattern. Notably, the controller 106 can be implemented within the housing of the lighting assembly 100, or outside the housing of the lighting assembly 100. The controller 106 is configured to independently control a light source 102 or a group of light sources 102 depending upon the area of application and desired light distribution pattern. Throughout the present disclosure, the term "controller" 106 as used herein generally describes various apparatus or devices for processing the electrical signals and thereby controlling the operation of each of the two or more light sources 102 based on the electrical signals. Notably, the controller 106 is configured to regulate the magnitude of the electrical potential supplied to each of the two or more light sources 102. Furthermore, the change in the magnitude of the electrical potential leads to a change in intensity and/or spectrum of the light beams emitted from the light sources 102. The controller 106 is operated in a manner so as to regulate the light beams emitted from the light sources 102 to obtain a particular light distribution pattern. It will be appreciated that the controller 106 can be implemented in numerous ways. In an example, the controller 106 is a dedicated hardware to perform the functions discussed herein. In another example, the controller 106 can be one or more microprocessors that may be programmed using software (e.g., microcode) to perform various functions discussed herein. In another example, the controller 106 may be a pulse width modulator, pulse amplitude modulator, pulse displacement modulator, resistor ladder, current source, voltage source, voltage ladder, switch, transistor, voltage controller, or other controller. The controller 106 generally regulates the current, voltage and/or power through the light source 102, in response to signals received. In an example, several light sources 102 emitting different colors may be used. Each of these light sources 102 emitting different colors may be driven through separate controllers 106. Furthermore, the controller 106 may be implemented with or without employing a processor, and also may be implemented as a combination of dedicated hardware to perform some functions and one or more programmed microprocessors along with an associated circuitry to perform other functions. Examples of controller 106 that may be employed in various embodiments of the present disclosure include, but are not limited to, conventional microprocessors, application specific integrated circuits (ASICs), and field-programmable gate arrays (FPGAs). For LED light source circuits, current limiting drivers are commonly used to According to an embodiment, the controller 106 comprises a memory (not shown) having pre-configured light distribution patterns stored therein, and wherein the controller 106 provides a user interface to allow a user to select one of the pre-configured light distribution patterns to provide the defined light distribution pattern. The memory is configured to store several different light distribution patterns based on one or more of intensity values of each of the light sources 102, color values of each of the light sources 102 and color temperature of each of the light sources 102. The different light distribution patterns thus obtained are stored in the memory for later retrieval. The term "memory" as used herein refers any physical device or hardware component capable of storing information temporarily and/or permanently. The different types of memory include but do not limit to, read-only memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, and program output for providing different light distribution patterns. Notably, the controller 106 and the memory can be implemented as different hardware components or may be implemented as a single hardware component within the lighting assembly 100.

According to an embodiment, the controller 106 provides a user interface allowing the user to select a particular pre-configured light distribution pattern from the memory. Furthermore, once a light distribution pattern is selected, the user interface also allows the user to modify the parameters of the selected light distribution pattern. Optionally, the user interface may constitute a button, a dial, a slider and the like for selecting a pre-configured light distribution pattern. In an example, the user interface comprises a two-button interface, wherein a first button is operable to select a particular light distribution pattern, and a second button is operable to control a particular parameter (such as intensity, color, spectrum and the like) associated with the selected light distribution pattern. For example, in this particular configuration, the second button may be held in a closed position with a parameter changing incrementally until the button is released, or the parameter may be changed each time the button is held and released. In another example, the interface may include a button and an adjustable input such as a slider. The button may be operable to control transitions from one light distribution pattern to other. The adjustable input may be operable to control the adjustment of a parameter value within a particular light distribution pattern. The adjustable input may be, for example, a dial, a slider, a knob, or any other device whose physical position may be converted to a parameter value for use by the controller 106. In another example, the interface may include two adjustable inputs. A first adjustable input may be operable to select a pre-configured light distribution pattern from the memory, and a second adjustable input may be operable to control a parameter within the light distribution pattern. In another example, a single dial may be used to cycle through all modes and parameters in a continuous fashion. It will be appreciated that other controls are possible, including keypads, touch pads, sliders, switches, dials, linear switches, rotary switches, variable switches, thumb wheels, dual inline package switches, or other input devices suitable to be operated by a user. It will be appreciated that the controller 106 may be configured to control a plurality of lighting assemblies arranged in an environment to control the overall lighting distribution of the environment.

Referring from FIG. 2 to FIG. 11D, illustrated are schematic representations of various exemplary arrangements of the lighting assembly 200, 400, 600, 800, 1000 and the respective light distribution pattern of each of the lighting assemblies, in accordance with various embodiments of the present disclosure. It will be appreciated that the embodiments as discussed herein are merely some of the several possible arrangements of the lighting assembly and should not unduly limit the scope of the claims herein.

Referring to FIG. 2, illustrated is a schematic representation of arrangement of elements of a lighting assembly 200 (such as the lighting assembly of FIG. 1), in accordance with an embodiment of the present disclosure. As shown, the lighting assembly 200 comprises two or more light sources 202, 204 and 206 (such as the light sources of FIG. 1) that are arranged in a linear manner at a fixed elevation. Further, the lighting assembly 200 comprises at least one optical element 208 (such as the optical element of FIG. 1) arranged below the two or more light sources 202, 204 and 206. Optionally, the optical element 208 may be arranged above the light sources 202, 204 and 206. It will be appreciated that the arrangement of the optical element 208 will depend on the direction of light emitted from the light sources 202, 204, and 206. Optionally, the light sources 202, 204 and 206 may be arranged in a circular manner and the optical source may be disposed above or below the light sources 202, 204 and 206. Further, the lighting assembly 200 comprises a controller 210.

In the illustrated embodiment, as shown, the lighting assembly 200 comprises three light sources 202, 204 and 206, the optical element 208 and the controller 210. The light sources 202, 204, and 206 are arranged in a linear manner at a fixed elevation with respect to the optical element 208. In an example, the light sources 202, 204 and 206 are arranged at a height of 20 mm with respect to the optical element 208. Furthermore, the optical element 208 is arranged on an axis perpendicular to the plane of the light source 204. The optical element 208 is arranged in a manner such that a corresponding light beam that is emitted from each of the light sources 202, 204 and 206 along channels 212A, 214A and 214A, respectively is received at the optical element 208. Further, each of the light beams emitted along the channels 212A, 214A and 216A from the light sources 202, 204 and 206 respectively, are guided by the optical element 208 to respective distinct optical paths 212B, 214B and 216B to illuminate different targeted surfaces in the environment. Notably, the light source 202 is aimed at a specific angle to illuminate a specific targeted surface, the light source 204 is aimed at another specific angle to illuminate another specific targeted surface and the light source 206 is aimed at yet another specific angle to illuminate yet another specific targeted surface. When in operation, the light sources 202, 204 and 206 are independently controlled via the controller 210 to obtain different light distribution patterns. Notably, the light sources can be of same color or different, say color LED packages.

Figure 3A:
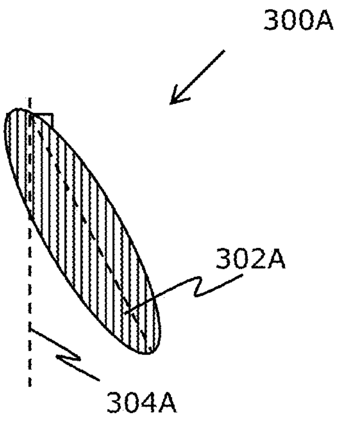

Referring to FIGS. 3A-3F, illustrated are schematic illustrations of different light distribution patterns provided by operating one or more of the light sources 202, 204 and 206 of FIG. 2, in accordance with various embodiments of the present disclosure. Notably, FIGS. 3A to 3F are described in conjunction with elements from FIG. 2. As illustrated in FIG. 3A, a first light distribution pattern 300A (such as a task lighting pattern) is generated at a specific angle to illuminate a targeted surface associated therewith. Herein, the first light distribution pattern 300A comprises a light beam 302A emitted from the light source 202 to illuminate a targeted surface. In an example, the first light distribution pattern 302A is generated at an angle of 30 degrees measured in an anti-clockwise sense with respect to an axis 304A perpendicular to an axis of linear arrangement of the light sources 202, 204 and 206. Notably, the first light distribution pattern 300A is generated by setting the magnitude of electrical potential of light source 204, and light source 206 to 0 Volts and the magnitude of electrical potential of light source 202 to specified maximum value, say 10 Volts, thereby generating the first light distribution pattern 300A comprising the light beam 302A. It will be appreciated that the intensity value and/or the color value of the first light distribution pattern 300A can be altered by employing aforementioned user interface provided by the controller 210.

Figure 3D:
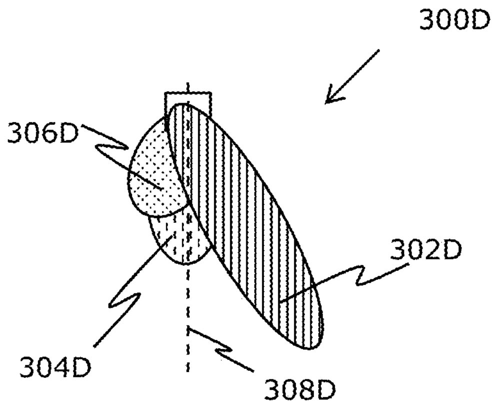
Figure 3B:
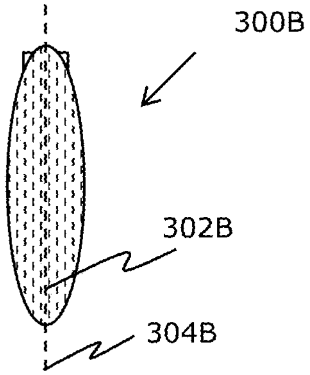

As illustrated in FIG. 3B, a second light distribution pattern 300B (such as a task lighting pattern) is generated at a specific angle to illuminate a targeted surface associated therewith. Herein, the second light distribution pattern 300B comprises a light beam 302B emitted from the light source 204 to illuminate a targeted surface. In an example, the second light distribution pattern 300B is generated at an angle of 0 degrees with respect to an axis 304B perpendicular to the axis of linear arrangement of the light sources 202, 204 and 206. Notably, the second light distribution pattern 300B is generated by setting the magnitude of electrical potential of light source 202, and light source 206 to 0 Volts and the magnitude of electrical potential of light source 204 to a specified maximum value, say 10 Volts, thereby generating the second light distribution pattern 300B comprising the light beam 302B. It will be appreciated that the intensity value and/or the color value of the second light distribution pattern 300B can be altered by employing aforementioned user interface provided by the controller 210.

Figure 3E:
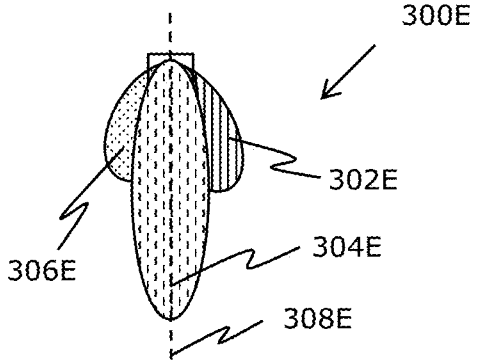
Figure 3C:
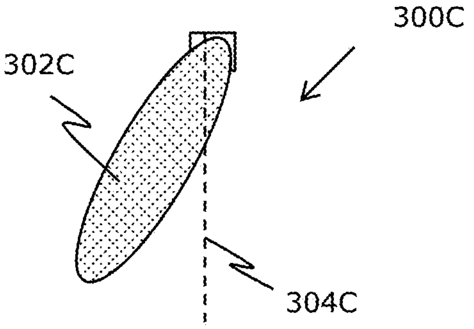

As illustrated in FIG. 3C, a third light distribution pattern 300C (such as a task lighting pattern) is generated at a specific angle to illuminate a targeted surface associated therewith. Herein, the third light distribution pattern 300C, comprises a light beam 302C emitted from the light source 206 to illuminate the targeted surface. In an example, the third light distribution pattern 300C is generated at an angle of 30 degrees in a clockwise sense with respect to an axis 304C perpendicular to the axis of linear arrangement of the light sources 202, 204 and 206. Notably, the third light distribution pattern 300C is generated by setting the magnitude of electrical potential of light source 202, and the light source 204 to 0 Volts and the magnitude of electrical potential of the light source 206 to a specified maximum value, say 10 Volts, thereby generating the third light distribution pattern 300C comprising the light beam 302C. It will be appreciated that the intensity value and/or the color value of the third light distribution pattern 300C can be altered by employing aforementioned user interface provided by the controller 210.

As illustrated in FIG. 3D, a fourth light distribution 300D pattern is generated to dominantly illuminate the target surface associated with the light source 202. Herein, the fourth light distribution pattern 300D, comprises a light beam 302D emitted from the light source 202, a light beam 304D emitted from the light source 204 and a light beam 306D emitted from the light source 206 to illuminate the targeted surface. In an example, the fourth light distribution pattern 300D is generated by setting the magnitude of electrical potential of the light source 202 to a specified maximum value, say 10 Volts to generate the light beam 302D, and the magnitude of electrical potential of each of the light source 204 and the light source 206 to a specified intermediate value, say 2 Volts, to generate the light beams 304D and 306D respectively, thereby generating the fourth light distribution pattern 300D. The fourth light distribution pattern 300D is dominantly generated at an angle of 30 degrees in an anti-clockwise sense with respect to an axis 308D perpendicular to the axis of arrangement of the light sources 202, 204 and 206. It will be appreciated that the intensity value and/or the color value of the fourth light distribution pattern 300D can be altered by employing aforementioned user interface provided by the controller 210.

As illustrated in FIG. 3E, a fifth light distribution pattern 300E is generated to dominantly illuminate the target surface associated with the light source 204. Herein, the fifth light distribution pattern 300E, comprises a light beam 302E emitted from the light source 202, a light beam 304E emitted from the light source 204 and a light beam 306E emitted from the light source 206 to illuminate the targeted surface. In an example, the fifth light distribution pattern 300E is generated by setting the magnitude of electrical potential of the light source 204 to a specified maximum value, say 10 Volts to generate the light beam 304E, and the magnitude of electrical potential of each of the light source 202 and the light source 206 to a specified intermediate value, say 2 Volts, to generate the light beam 302E and the light beam 306E respectively, thereby generating the fifth distribution pattern 300E. The fifth light distribution pattern 300E is generated dominantly at an angle of 0 degrees with respect to an axis 308E perpendicular to the axis of linear arrangement of the light sources 202, 204 and 206. It will be appreciated that the intensity value and/or the color value of the fifth light distribution pattern 300E can be altered by employing aforementioned user interface provided by the controller 210.

Figure 3F:
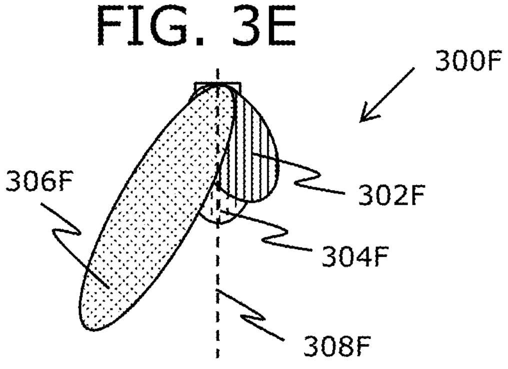

As illustrated in FIG. 3F, a sixth light distribution pattern 300F is generated to dominantly illuminate the target surface associated with the light source 206. Herein, the sixth light distribution pattern 300F, comprises a light beam 302F emitted from the light source 202, a light beam 304F emitted from the light source 204 and a light beam 306F emitted from the light source 206 to illuminate the targeted surface. In an example, the sixth light distribution pattern 300F is generated by setting the magnitude of electrical potential of the light source 206 to a specified maximum value, say 10 Volts, to generate the light beam 306F and the magnitude of electrical potential of each of the light source 202 and the light source 204 to a specified intermediate value, say 2 Volts, to generate the light beam 302F and 304F respectively, thereby generating the sixth distribution pattern 300F. The sixth light distribution pattern 300F is generated dominantly at an angle of 30 degrees in a clockwise sense with respect to an axis 308F perpendicular to the axis of arrangement of light sources 202, 204 and 206. It will be appreciated that the intensity value and/or the color value of the sixth light distribution 300F pattern can be altered by employing aforementioned user interface provided by the controller 210.

Referring to FIG. 4, illustrated is a schematic representation of arrangement of elements of a lighting assembly 400 (such as the lighting assembly of FIG. 1), in accordance with an embodiment of the present disclosure. As shown, the lighting assembly 400 comprises two or more light sources 402, 404 and 406 (such as the light sources of FIG. 1) that are arranged in a linear manner at a fixed elevation. Further, the lighting assembly 400 comprises at least one optical element 408 (such as the optical element of FIG. 1) arranged below the two or more light sources 202, 204 and 206. Optionally, the optical element 408 may be arranged above the light sources 402, 404 and 406. Further, the lighting assembly 400 comprises a controller 410. The light sources 402, 40 and 406 are arranged in a linear manner at a fixed elevation with respect to the optical element 408. In an example, the light sources 402, 404 and 406 are arranged at a height of, say, 20 mm with respect to the optical element 408. Furthermore, the optical element 408 is arranged on an axis perpendicular to the plane of light source 402. The optical element 408 is arranged in a manner such that the light beam is emitted from the light source 402 along the channel 412A, from the light source 402 along the channel 414A, and from the light source 406 along the channel 416A. Further, the light beams emitted along the channels 412A, 414A and 416A from the light sources 402, 404 and 406 respectively, are guided by the optical element 408 to respective distinct optical paths 412B, 414B and 416B to illuminate different targeted surfaces in the environment. Notably, the light source 402 is aimed at a specific angle to illuminate a specific targeted surface, the light source 404 is aimed at another specific angle to illuminate another specific targeted surface and the light source 406 is aimed at another specific angle to illuminate another specific targeted surface. When in operation, the light sources 402, 404 and 406 are independently controlled via the controller 410 to obtain different light distribution patterns. Notably, the light sources can be of same color or different, say color LED packages.

Figure 5A:
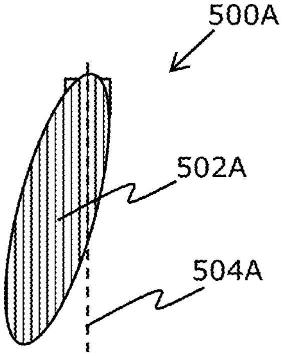

Referring to FIGS. 5A-5F, illustrated are schematic illustrations of different light distribution patterns provided by operating one or more of the light sources 402, 404 and 406 of FIG. 4, in accordance with various embodiments of the present disclosure. Notably, FIGS. 5A to 5F are described in conjunction with elements from FIG. 4. As illustrated in FIG. 5A, a first light distribution pattern 500A (such as perimeter lighting pattern) is generated at a specific angle to illuminate a targeted surface associated therewith. Herein, the first light distribution pattern 500A comprises a light beam 502A emitted from the light source 402 to illuminate the targeted surface. In an example, the first light distribution pattern 500A is generated at an angle of 15 degrees measured in an anti-clockwise sense with respect to an axis 504A perpendicular to an axis of linear arrangement of the light sources 402, 404 and 406. Notably, the first light distribution pattern 500A is generated by setting the magnitude of electrical potential of light source 404, and the light source 406 to 0 Volts and the magnitude of electrical potential of light source 402 to specified maximum value, say 10 Volts, thereby generating the first light distribution pattern 500A comprising the light beam 502A. As shown, the first light distribution pattern 500A illuminates a surface at a specified distance from the wall, say 2 feet. It will be appreciated that the intensity value and/or the color value of the first light distribution pattern 500A can be altered by employing aforementioned user interface provided by the controller 410.

Figure 5D:
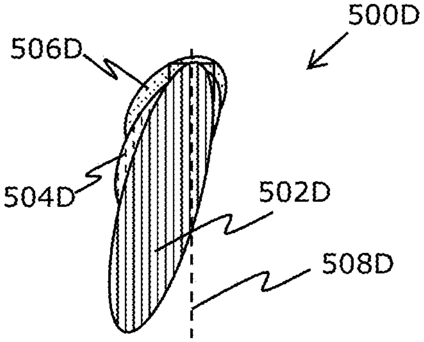
Figure 5B:
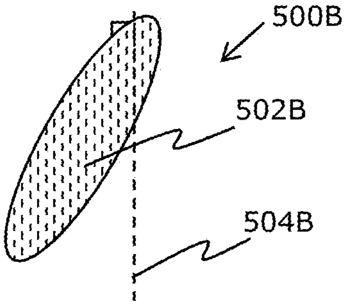

As illustrated in FIG. 5B, a second light distribution pattern 500B (such as a wall washing lighting pattern) is generated at a specific angle to illuminate a targeted surface associated therewith. Herein, the second light distribution pattern 500B comprises a light beam 502B emitted from the light source 404 to illuminate the targeted surface. In an example, the second lighting pattern 500B is generated at an angle of 30 degrees in an anti-clockwise sense with respect to an axis 504B perpendicular to the axis of linear arrangement of the light sources 402, 404 and 406. Notably, the second lighting pattern 500B is generated by setting the magnitude of electrical potential of light source 402, and light source 406 to 0 Volts and the magnitude of electrical potential of light source 404 to specified maximum value, say 10 Volts, thereby generating the second light distribution pattern 500B comprising the light beam 502B. As shown, the second light distribution pattern 500B is generated to illuminate a portion on the wall 418, for example to highlight a work of art affixed on the wall 418. It will be appreciated that the intensity value and/or the color value of the second light distribution pattern 500B can be altered by employing aforementioned user interface provided by the controller 410.

Figure 5E:
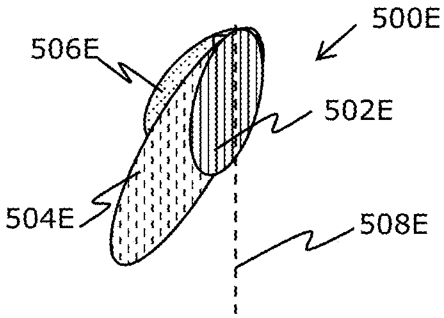
Figure 5C:
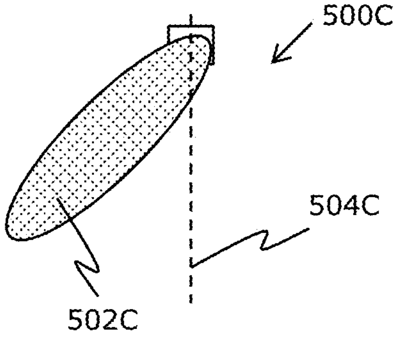

As illustrated in FIG. 5C, a third light distribution pattern 500C (such as a wall washing lighting pattern) is generated at a specific angle to illuminate a targeted surface associated therewith. Herein, the third light distribution pattern 500C comprises a light beam 502C emitted from the light source 406 to illuminate the targeted surface. In an example, the third light distribution pattern 500C is generated at an angle of 45 degrees in an anti-clockwise sense with respect to an axis 504C perpendicular to an axis of linear arrangement of the light sources 402, 404 and 406. Notably, the third light distribution pattern 500C is generated by setting the magnitude of electrical potential of light source 402, and light source 304 to 0 Volts and the magnitude of electrical potential of light source 306 to specified maximum value, say 10 Volts, thereby generating the second light distribution pattern 500C comprising the light beam 502C. It will be appreciated that the intensity value and/or the color value of the third light distribution 500C pattern can be altered by employing aforementioned user interface provided by the controller 410.

As illustrated in FIG. 5D, a fourth light distribution pattern 500D is generated to dominantly illuminate a targeted surface associated with the light source 402. Herein, the fourth light distribution pattern 500D comprises a light beam 502D emitted from the light source 402, a light beam 504D emitted from the light source 404 and a light beam 506D emitted from the light source 406 to illuminate the targeted surface. In an example, the fourth light distribution pattern 500D is generated by setting the magnitude of electrical potential of the light source 402 to a specified maximum value, say 10 Volts to generate the light beam 502D, and the magnitude of electrical potential of each of the light source 404 and the light source 406 to a specified intermediate value, say 2 Volts, to generate the light beams 504D and 506D respectively, thereby generating the fourth light distribution pattern 500D. The fourth light distribution pattern 500D is dominantly generated at an angle of 30 degrees in an anti-clockwise sense with respect to an axis 508D perpendicular to an axis of arrangement of the light sources 402, 404 and 406. As shown, the lighting assembly 400 predominantly illuminates the surface at the specified distance from the wall 418. It will be appreciated that the intensity value and/or the color value of the fourth light distribution pattern 500D can be altered by employing aforementioned user interface provided by the controller 410.

As illustrated in FIG. 5E, a fifth light distribution pattern 500E is generated to dominantly illuminate a target surface associated with the light source 404. In an example, the fifth light distribution pattern 500E is generated by setting the magnitude of electrical potential of the light source 404 to a specified maximum value, say 10 Volts to generate the light beam 504E, and the magnitude of electrical potential of each of the light source 402 and the light source 406 to a specified intermediate value, say 2 Volts to generate the light beams 502E and the 506E respectively, thereby generating the fifth light distribution pattern 500E. The fifth light distribution pattern 500E is generated dominantly at an angle of 30 degrees with respect to an axis 508E perpendicular to an axis of arrangement of the light sources 402, 404 and 406. As shown, the fifth light distribution pattern 500E is generated to predominantly illuminate the targeted surface on the wall 418. It will be appreciated that the intensity value and/or the color value of the fifth light distribution pattern 500E can be altered by employing aforementioned user interface provided by the controller 410.

Figure 5F:
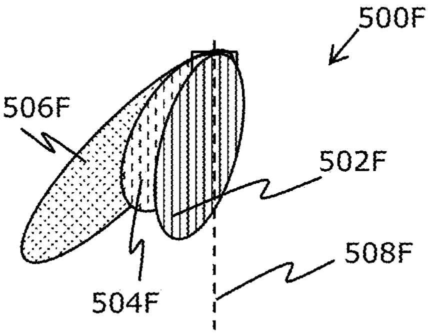

As illustrated in FIG. 5F, a sixth light distribution pattern 500F is generated to dominantly illuminate the target surface associated with the light source 406. Herein, the sixth light distribution pattern 500F, comprises a light beam 502F emitted from the light source 402, a light beam 504F emitted from the light source 404 and a light beam 506F emitted from the light source 406 to illuminate the targeted surface. In an example, the sixth light distribution pattern 500F is generated by setting the magnitude of electrical potential of the light source 406 to a specified maximum value, say 10 Volts to generate the light beam 506F, and the magnitude of electrical potential of each of the light source 402 and the light source 404 to a specified intermediate value, say 2 Volts to generate the light beams 502F and 504F respectively, thereby generating the sixth light distribution pattern 500F. The sixth light distribution pattern 500F is generated dominantly at an angle of 45 degrees in a clockwise sense with respect to an axis 508F perpendicular to an axis of linear arrangement of light sources 402, 404 and 406. As shown, the sixth light distribution pattern 500F is generated to predominantly illuminate the targeted surface on the wall 418. It will be appreciated that the intensity value and/or the color value of the sixth light distribution pattern 500F can be altered by employing aforementioned user interface provided by the controller 410.

Referring to FIG. 6, illustrated is a schematic representation of arrangement of elements of a lighting assembly 600 (such as the lighting assembly of FIG. 1), in accordance with an embodiment of the present disclosure. As shown, the lighting assembly 600 comprises two light sources 602 and 604 (such as the light sources of FIG. 1) that are arranged in a linear manner at a fixed elevation. Further, the lighting assembly 600 comprises a primary transmissive optical element 606 (such as the optical element of FIG. 1), which in this embodiment can also be considered to be a light guide with respect to both light sources 602 and 604 which are independently electrically addressable by a controller 608 (such as the controller of FIG. 1) to provide a first light source channel controlling the output of the first light source 602 and a second light source channel controlling the output of the second light source 604. The primary transmissive optical element 606 is arranged at a same elevation relative to the light source 602 and the light source 604. Furthermore, the light source 602 is arranged adjacent to one longitudinal end of the optical element 606 and the light source 604 is arranged adjacent to the other longitudinal end of the optical element 606. In other words, the optical element 606 is disposed between the light sources 602 and 604. 606A is the first input face of primary transmissive optical element 606 into which the light from light source 602 is input and 606B is the second input face into which light is input from light source 604. Within the primary transmissive optical element 606, an example light ray 602A from light source 602 is internally reflected within the optical element 606 and propagated out of the optical element output face 606C at an angular output axis of 602B. In an equivalent manner, an example light ray 604A from light source 604 is internally reflected within the optical element 606 and propagated out of the optical element output face 606C at an angular output axis of 604B. In an example application embodiment, the primary transmissive optical element 606 is a light guide employed to create a wall washing light distribution pattern in different directions from the light received from the light sources 602 and 604.

Figure 7A:
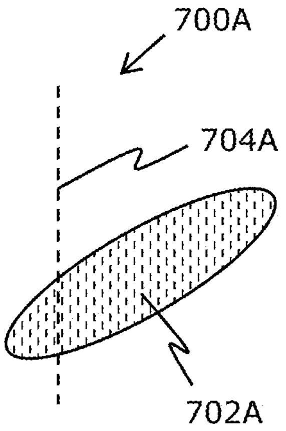

Referring to FIGS. 7A-7D, illustrated are schematic representations of different light distribution patterns provided by operating one or more of the light sources 602 and 604 of FIG. 6 in accordance with various embodiments of the present disclosure. Notably, FIGS. 7A to 7D are described in conjunction with elements from FIG. 6. As illustrated in FIG. 7A, a first light distribution pattern 700A (such as a ceiling wash pattern) is generated to illuminate the targeted surface associated with the light source 602. Herein, the first light distribution pattern 700A comprises a light beam 702A emitted from the light source 602 to illuminate the targeted surface. In an example, the first light distribution pattern 700A is generated by setting the magnitude of electrical potential of the light source 702 to a specified maximum value, say 10 Volts, and the magnitude of electrical potential of the light source 704 to a specified minimum value, say 0 Volts, thereby generating the first light distribution pattern 700A comprising the light beam 702A. The first light distribution pattern 700A is generated at an angle of 45 degrees in clockwise sense with respect to a lateral axis 704A of the optical element 606. As shown, the first light distribution pattern 700A is a ceiling wash pattern generated to illuminate, for example, a right portion of the ceiling. It will be appreciated that the intensity value and/or the color value of the first light distribution pattern 700A can be altered by employing aforementioned user interface provided by the controller 608.

Figure 7C:
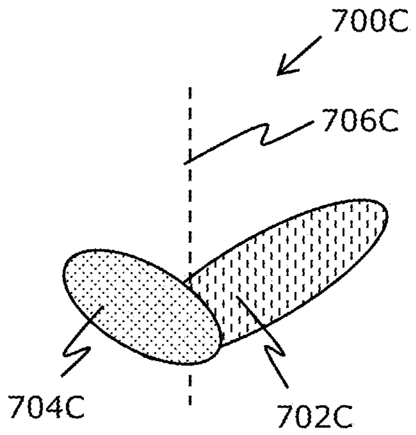
Figure 7B:
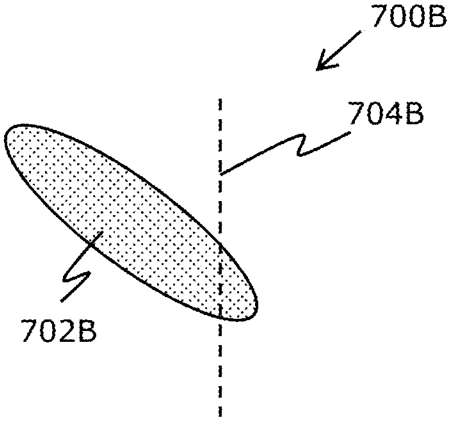

As illustrated in FIG. 7B, a second light distribution pattern 700B (such as a ceiling wash pattern) is generated to illuminate a target surface associated with the light source 604. Herein, the second light distribution pattern 700B comprises a light beam 702B emitted from the light source 704 to illuminate the targeted surface. In an example, the second light distribution pattern 700B is generated by setting the magnitude of electrical potential of the light source 704 to a specified maximum value, say 10 Volts, and the magnitude of electrical potential of the light source 702 to a specified minimum value, say 0 Volts, thereby generating the second light distribution pattern 700B comprising the light beam 702B. The second light distribution pattern 700B is generated at an angle of 45 degrees in an anti-clockwise sense with respect to a lateral axis 704B of the optical element 606. As shown, the second light distribution pattern 700B is a ceiling wash pattern generated to illuminate, for example, a left portion of the ceiling. It will be appreciated that the intensity value and/or the color value of the second light distribution pattern 700B can be altered by employing aforementioned user interface provided by the controller 608.

As illustrated in FIG. 7C, a third light distribution pattern 700C (such as a ceiling wash pattern) is generated to dominantly illuminate the target surface associated with the light source 602. Herein, the third light distribution pattern 700C comprises a light beam 702C emitted from the light source 602 and a light beam 704B emitted from the light source 604 to illuminate the targeted surface. In an example, the third light distribution pattern 700C is generated by setting the magnitude of electrical potential of the light source 602 to a specified maximum value, say 10 Volts to generate the light beam 702C, and the magnitude of electrical potential of the light source 604 to a specified intermediate value, say 2 Volts to generate the light beam 704C, thereby generating the third light distribution pattern 700C. The third light distribution pattern 700C is generated predominantly at an angle of 45 degrees in a clockwise sense with respect to a lateral axis 706C of the optical element 606. As shown, the third light distribution pattern 700C is a ceiling wash pattern generated to predominantly illuminate a right portion of the ceiling and to minimally illuminate a left portion of the ceiling. It will be appreciated that the intensity value and/or the color value of the third light distribution pattern 700C can be altered by employing aforementioned user interface provided by the controller 608.

Figure 7D:
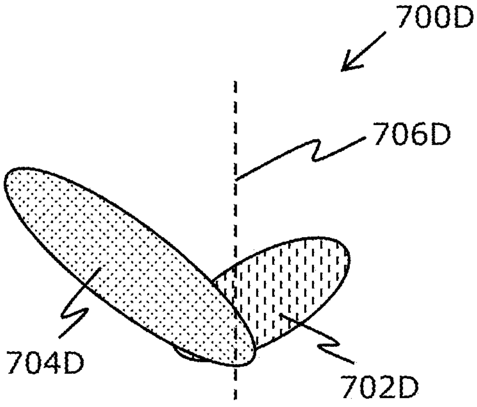

As illustrated in FIG. 7D, a fourth light distribution pattern 700D (such as a ceiling wash pattern) is generated to dominantly illuminate the target surface associated with the light source 704. Herein, the fourth light distribution pattern 700D comprises a light beam 702D emitted from the light source 602 and a light beam 704D emitted from the light source 604 to illuminate the targeted surface. In an example, the fourth light distribution pattern 700D is generated by setting the magnitude of electrical potential of the light source 604 to a specified maximum value, say 10 Volts to generate the light beam 702D, and the magnitude of electrical potential of the light source 602 to a specified intermediate value, say 2 Volts to generate the light beam 704D, thereby generating the fourth light distribution pattern 700D. The fourth light distribution pattern 700D is generated predominantly at an angle of 45 degrees in an anti-clockwise sense with respect to a lateral axis 706D of the optical element 606. As shown, the fourth light distribution pattern 700D is a ceiling wash pattern generated to predominantly illuminate a left portion of the ceiling and to minimally illuminate a right portion of the ceiling. It will be appreciated that the intensity value and/or the color value of the fourth light distribution pattern 700D can be altered by employing aforementioned user interface provided by the controller 608.

Referring to FIG. 8, illustrated is a schematic representation of arrangements of elements of the lighting assembly 800 (such as the lighting assembly of FIG. 1), in accordance with an embodiment of the present disclosure. As shown, the lighting assembly 800 comprises three light sources 802, 804 and 806 (such as the light sources of FIG. 1). Further, the lighting assembly comprises one primary transmissive optical element 808 (such as the optical element of FIG. 1) and one controller 810 (such as the controller of FIG. 1). The primary transmissive optical element 808 is arranged at a same elevation relative to the light source 802 and in this embodiment functions as a light guide with respect to the light source 802 and is arranged adjacent to the input face 808A of the primary transmissive optical element 808. Further, the optical element 808 and the light source 802 are arranged at an elevation different than the light source 804 and the light source 806. In an example, the light source 802 emits RED light, the light source 804 emits BLUE light and the light source 806 emits GREEN light. Further, the optical element 808 is a light guide employed to create a wall wash light distribution pattern and/or a cove light distribution pattern of monochromatic color or polychromatic color in different directions from the light of different colors as received from the light sources 802, 804 and 806.

Figure 9A:
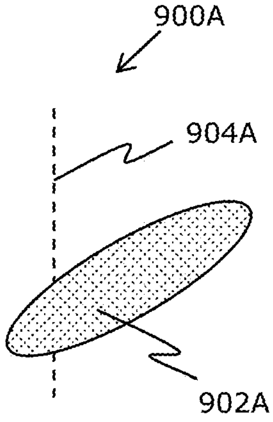

Referring to FIGS. 9A-9E, illustrated are schematic representations of different light distribution patterns provided by operating one or more of the light sources 802, 804, and 806 of FIG. 8, in accordance with various embodiments of the present disclosure. Notably, FIGS. 9A to 9E are described in conjunction with elements from FIG. 8. As illustrated in FIG. 9A, a first light distribution pattern 900A (such as a ceiling wash pattern) is generated to illuminate the targeted surface associated with the light source 802 emitting RED color. Herein, the first light distribution pattern 900A comprises a light beam 902A emitted from the light source 802 to illuminate the targeted surface. In an example, the first light distribution pattern 900A is generated by setting the magnitude of electrical potential of the light source 902 to a specified maximum value, say 10 Volts, and the magnitude of electrical potential of each of the light sources 904 and 906 to a specified minimum value, say 0 Volts, thereby generating the first light distribution pattern 900A comprising the light beam 902A. The first light distribution pattern 900A is generated at an angle of 45 degrees in a clockwise sense with respect to a lateral axis 904A of the optical element 808. In an example, the first light distribution pattern 900A is a wall wash pattern generated to illuminate a ceiling in red color. It will be appreciated that the intensity value of the first light distribution pattern 900A can be altered by employing aforementioned user interface provided by the controller 810.

Figure 9B:
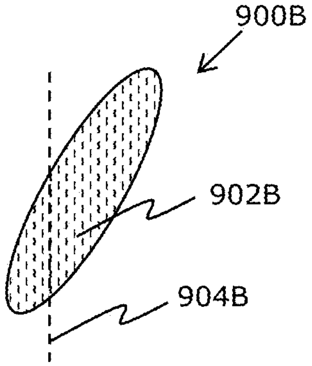

As illustrated in FIG. 9B, a second light distribution pattern 900B (such as a cove lighting pattern) is generated to illuminate the targeted surface associated with the light source 804. Herein, the second light distribution pattern 900B comprises a light beam 902B emitted from the light source 804 to illuminate the targeted surface. In an example, the second light distribution pattern 900B is generated by setting the magnitude of electrical potential of the light source 804 to a specified maximum value, say 10 Volts, and the magnitude of electrical potential of the light source 802 and the light source 806 to a specified minimum value, say 0 Volts, thereby generating the second light distribution pattern 900B comprising the light beam 902B. The second light distribution pattern 900B is generated at an angle of 60 degrees in clockwise sense with respect to a lateral axis 904B of the optical element 808. In an example, the second light distribution pattern 900B is generated to illuminate, or aesthetically highlight a recess in the ceiling in blue color. It will be appreciated that the intensity value of the second light distribution pattern 900B can be altered by employing aforementioned user interface provided by the controller 810.

Figure 9C:
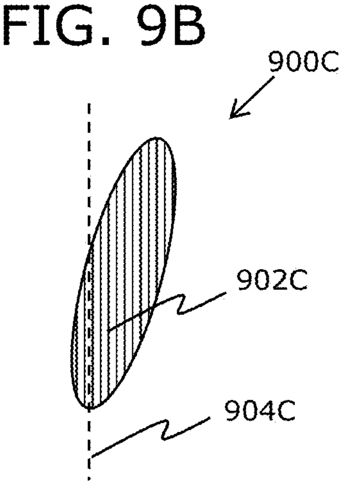

As illustrated in FIG. 9C, a third light distribution pattern 900C (such as a cove lighting pattern) is generated to illuminate the targeted surface associated with the light source 806. Herein, the second light distribution pattern 900B comprises a light beam 902C emitted from the light source 806 to illuminate the targeted surface. In an example, the third light distribution pattern 900C is generated by setting the magnitude of electrical potential of the light source 806 to a specified maximum value, say 10 Volts, and the magnitude of electrical potential of the light source 802 and the light source 804 to a specified minimum value, say 0 Volts, thereby generating the third light distribution pattern 900C comprising the light beam 902C. The third light distribution pattern 900C is generated at an angle of 60 degrees in a clockwise sense with respect to a lateral axis 904C of the optical element 808. In an example, the third light distribution pattern 900C is generated to illuminate, or aesthetically highlight a recess in the ceiling in green color. It will be appreciated that the intensity value of the third light distribution pattern 900C can be altered by employing aforementioned user interface provided by the controller 810.

Figure 9D:
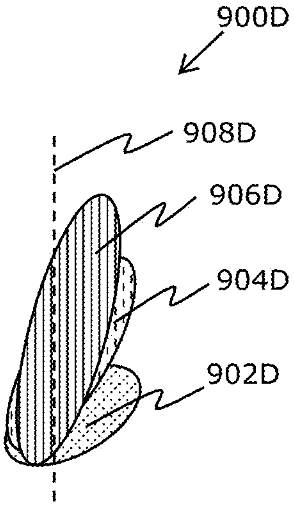

As illustrated in FIG. 9D, a fourth light distribution pattern 900D is generated to dominantly illuminate a targeted surface associated with the light source 802. Herein, the fourth light distribution pattern 900D comprises a light beam 902D emitted from the light source 802, a light beam 904D emitted from the light source 804 and a light beam 906D emitted from the light source 806 to illuminate the targeted surface. In an example, the fourth light distribution pattern 900D is generated by setting the magnitude of electrical potential electrical potential of the light source 802 to a specified maximum value, say 10 Volts to generate the light beam 902B, and the magnitude of electrical potential of each the light sources 804 and 806 to a specified minimum value, say 0 Volts to generate the light beams 904D and 906D respectively, thereby generating the fourth light distribution pattern 900D. The fourth light distribution pattern 900D is generated at an angle of 60 degrees in a clockwise sense with respect to the lateral axis 908D of the optical element 908. In an example, the fourth light distribution pattern 900D is a ceiling wash pattern in a color generated by mixing of the colors blue, red and green. It will be appreciated that the intensity value of the fourth light distribution pattern 900D to mix various colors can be altered by employing aforementioned user interface provided by the controller 810.

Figure 9E:
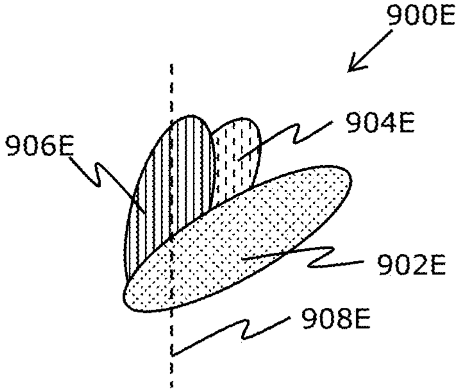

As illustrated in FIG. 9E, a fifth light distribution pattern 900E is generated to dominantly illuminate a targeted surface associated with the light source 804. Herein, the fifth light distribution pattern 900E comprises a light beam 902E emitted from the light source 802, a light beam 904E emitted from the light source 804 and a light beam 906E emitted from the light source 806 to illuminate the targeted surface. In an example, the fifth light distribution pattern 900E is generated by setting the magnitude of electrical potential of the light source 804 to a specified maximum value, say 10 Volts to generate the light beam 904E, and the magnitude of electrical potential of each the light sources 802 and 806 to a specified intermediate value, say 5 Volts to generate the light beam 902E and 906E respectively, thereby generating the fifth light distribution pattern 900D at an angle of 60 degrees in a clockwise sense with respect to a lateral axis 908E of the optical element 808. In an example, the fifth light distribution pattern 900E is generated to illuminate, or aesthetically highlight a recess in the ceiling in a color generated by mixing of the colors blue, red and green. It will be appreciated that the intensity value of the fifth light distribution pattern 900E to mix various colors can be altered by employing aforementioned user interface provided by the controller 810.

Referring to FIG. 10, illustrated is a schematic representation of arrangements of a lighting assembly 1000 (such as the lighting assembly of FIG. 1), in accordance with an embodiment of the present disclosure. As shown, the lighting assembly 1000 comprises two light sources 1002 and 1004 (such as the light sources of FIG. 1) that are arranged in a linear manner at a fixed elevation. Further, the lighting assembly 1000 comprises one primary transmissive optical element 1006 (such as the optical element of FIG. 1) and one controller 1008 (such as the controller of FIG. 1). The primary transmissive optical element 1006 is arranged at a same elevation relative to the light source 1002 and in this embodiment functions as a light guide with respect to the light source 1002. Furthermore, the light source 1002 is arranged adjacent to one end of the primary transmissive optical element 1006 wherein light from the first light source 1002 enters the first input face 1006A of the primary transmissive optical element 1006 and internally reflects within the primary transmissive optical element 1006 before being emitted from the output face of the primary transmissive optical element 1006. Further, the optical element 1006 is arranged at a different elevation than the second light source 1004. Light from the second light source 1004 enters a second input face 1006B of the primary transmissive optical element 1006, transmits through the optical element and is emitted from the output face 1006C of the primary transmissive optical element. In further embodiments, the primary transmissive optical element may additionally contain fresnel lens features and additionally may contain a focal region as for example detailed in FIG. 18 and its description, or as generally described in paragraphs and [00110]. In an example application embodiment, the primary transmissive optical element 1006 is a light guide configured to create a wall wash light distribution pattern in a specified direction from the light received from the first light source 1002. Furthermore, the light guide is concurrently configured to create a cove light pattern from the light beam received from the second light source 1004.

Figure 11A:
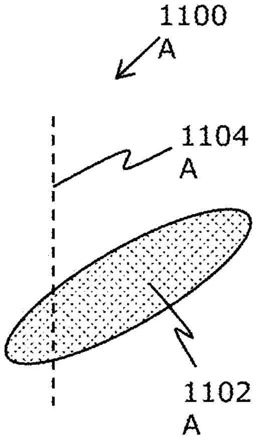

Referring to FIGS. 11A-11D, illustrated are schematic representations of different light distribution patterns provided by operating one or more of the light sources 1002, and 1004 of FIG. 10, in accordance with various embodiments of the present disclosure. Notably, FIGS. 11A to 11D are described in conjunction with elements from FIG. 10. As illustrated in FIG. 11A, a first light distribution pattern 1100 (such as a wall wash pattern) is generated to illuminate the target surface associated with the light source 1002. Herein, the first light distribution pattern 1100A comprises a light beam 1102A emitted from the light source 1002 to illuminate the targeted surface. In an example, the first light distribution pattern 1100A is generated by setting the magnitude of electrical potential of the light source 1002 to a specified maximum value, say 10 Volts, and the magnitude of electrical potential of the light source 1004 to a specified minimum value, say 0 Volts, thereby generating the first light distribution pattern 1100A comprising the light beam 1102A. The first light distribution pattern 1100A is generated at an angle of 45 degrees in a clockwise sense with respect to a lateral axis 1104A of the optical element 1006. In an example, the first light distribution pattern 1100A is a wall wash pattern generated to illuminate a wall. It will be appreciated that the intensity value of the first light distribution pattern 1100A can be altered by employing aforementioned user interface provided by the controller 1108.

Figure 11C:
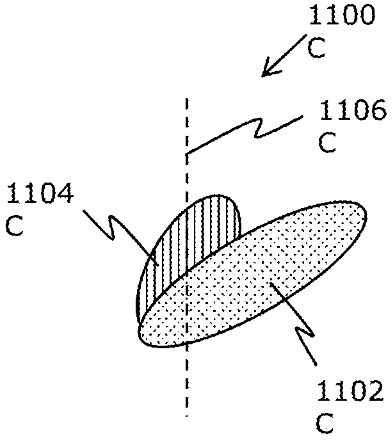
Figure 11B:
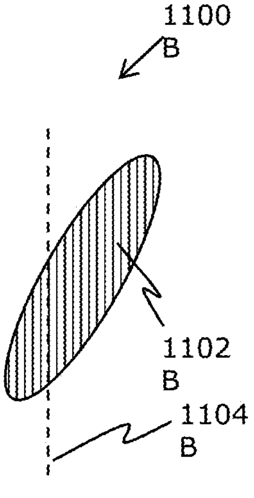

As illustrated in FIG. 11B, a second light distribution pattern (such as a cove lighting pattern) is generated to illuminate a target surface associated with the light source 1004. Herein, the second light distribution pattern 1100B comprises a light beam 1102B emitted from the light source 1004 to illuminate the targeted surface. In an example, the second light distribution pattern 1100B is generated by setting the magnitude of electrical potential of the light source 1004 to a specified maximum value, say 10 Volts, and the magnitude of electrical potential of the light source 1002 to a specified minimum value, say 0 Volts, thereby generating the second light distribution pattern 1100B comprising the light beam 1102B. The second light distribution pattern 1100B is generated at an angle of 30 degrees in a clockwise sense with respect to a lateral axis 1104B of the optical element 1006. In an example, the second light distribution pattern 1100B is generated to illuminate, or aesthetically highlight a recess in the ceiling. It will be appreciated that the intensity value of the second light distribution pattern 1100B can be altered by employing aforementioned user interface provided by the controller 1008.

As illustrated in FIG. 11C, a third light distribution pattern 1100C (such as a wall wash pattern) is generated to dominantly illuminate the target surface associated with the light source 1102. Herein, the third light distribution pattern 1100C comprises a light beam 1102C emitted from the light source 1002 and a light beam 1104B emitted from the light source 1004 to illuminate the targeted surface. In an example, the third light distribution pattern 1100C is generated by setting the magnitude of electrical potential of the light source 1102 to a specified maximum value, say 10 Volts to generate the light beam 1102C, and the magnitude of electrical potential of the light source 1104 to a specified intermediate value, say 2 Volts to generate the light beam 1104C, thereby generating the third light distribution pattern 1100C. The third light distribution pattern 1100C is generated predominantly at an angle of 45 degrees in a clockwise sense with respect to a lateral axis 1106C of the optical element 1006. As shown, the third light distribution pattern 1100C is a wall wash pattern generated to predominantly illuminate the wall and to minimally illuminate the recess in the wall. It will be appreciated that the intensity value of the third light distribution pattern 1100C can be altered by employing aforementioned user interface provided by the controller 1008.

Figure 11D:
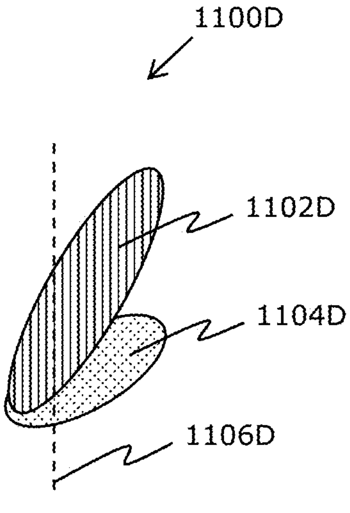

As illustrated in FIG. 11D, a fourth light distribution pattern 1100D (such as a cove lighting pattern) is generated to dominantly illuminate the target surface associated with the light source 1004. Herein, the fourth light distribution pattern 1100D comprises a light beam 1102D emitted from the light source 1002 and a light beam 1104D emitted from the light source 1004 to illuminate the targeted surface. In an example, the fourth light distribution pattern 1100D is generated by setting the magnitude of electrical potential of the light source 1004 to a specified maximum value, say 10 Volts to generate the light beam 1104D, and the magnitude of electrical potential of the light source 1002 to a specified intermediate value, say 5 Volts to generate the light beam 1102D, thereby generating the fourth light distribution pattern 1100D. The fourth light distribution pattern 1100D is generated predominantly at an angle of 30 degrees in a clockwise sense with respect to a lateral axis 1106D of the optical element 1006. As shown, the fourth light distribution pattern 1100D is a cove lighting pattern generated to predominantly illuminate the recess in the ceiling and to minimally illuminate the wall. It will be appreciated that the intensity value of the fourth light distribution pattern 1100D can be altered by employing aforementioned user interface provided by the controller 1008.

Figure 12A:
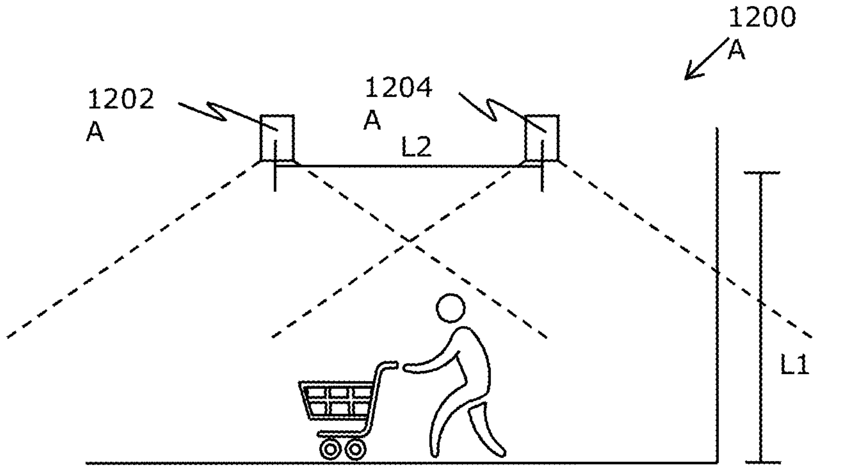

Referring to FIGS. 12A-12E, illustrated are schematic representations of the arrangements of lighting assemblies 1200A, 1200B, 1200C, 1200D and 1200E (such as the lighting assembly of FIG. 1) respectively, in accordance with various exemplary embodiments of the present disclosure. As illustrated in FIG. 12A, the lighting assembly 1200A comprises the light sources 1202A and 1204A (such as the light sources of FIG. 1) that are arranged in a linear manner at a fixed elevation L1. Herein, the light sources 1202A and 1204A are spaced apart by a distance L2. The distance L2 will depend on the area that is intended to be illuminated by the lighting assembly 1200A. In an example, the lighting assembly 1200A is installed in a supermarket or a retail source. In the illustrated example, the distance L1 may be about 3-5 meters and the distance L2 may be about 3 meters, and such configuration may be sufficient to illuminate an area with width of about 5 meters (as shown). The light sources 1202A and 1204A may produce general light distribution pattern having a wide beam width with a unified glare rating (UGR) being under 19, so as to provide a visual comfort to people present in the supermarket. Optionally, the light sources 1202A and 1204A are sensitive to motion and one or both light sources 1202A and 1204A are operational based on a motion sensed in or around the intended illuminated area, thereby making efficient use of energy resources. Notably, the other elements (such as optical element and controller) of the lighting assembly 1200A are not visible to the user for aesthetic purposes.

Figure 12B:
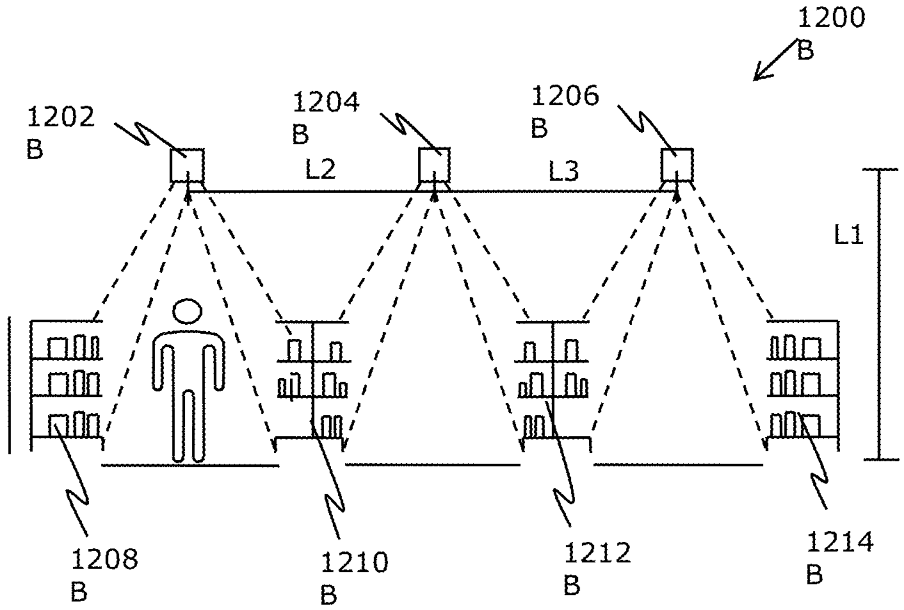

As illustrated in FIG. 12B, the lighting assembly 1200B comprises the light sources 1202B, 1204B and 1206B (such as the light sources of FIG. 1) that are arranged in a linear manner at a fixed elevation L1. Herein, the light sources 1202B and 1204B are spaced apart by a distance L2 and the light sources 1204B and 1206B are spaced apart by a distance L3. The distance L2 will depend on the area that is intended to be illuminated by the lighting assembly 1200B. In an example, the lighting assembly 1200B is installed in a supermarket or a retail source to illuminate shelf surfaces in a retail store. The light sources 1202B, 1204B and 1206B generate double asymmetric light distribution to efficiently illuminate each side of the shelf surfaces. As shown, the light source 1202B efficiently illuminates one surface of the shelf 1208B, and one surface of the shelf 1210B. The light source 1204B efficiently illuminates another surface of the shelf 1210B, and one surface of the shelf 1212B. The light source 1206B efficiently illuminates another surface of the shelf 1212B, and one surface of the shelf 1214B. Notably, the other elements (such as optical element and controller) of the lighting assembly 1200B are not visible to the user for aesthetic purposes.

Figure 12C:
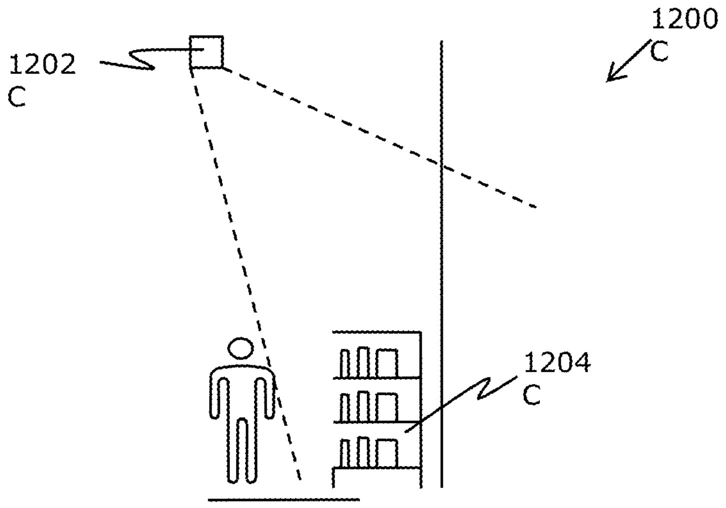

As illustrated in FIG. 12C, the lighting assembly 1200C comprises the light source 1202C (such as the light sources of FIG. 1). As shown, the lighting assembly 1200C is installed to efficiently illuminate a vertical surface associated with a shelf 1204C of a retail store. In an example, the light source 1202C generates a wall washing pattern to efficiently illuminate the shelf 1204C.

Figure 12D:
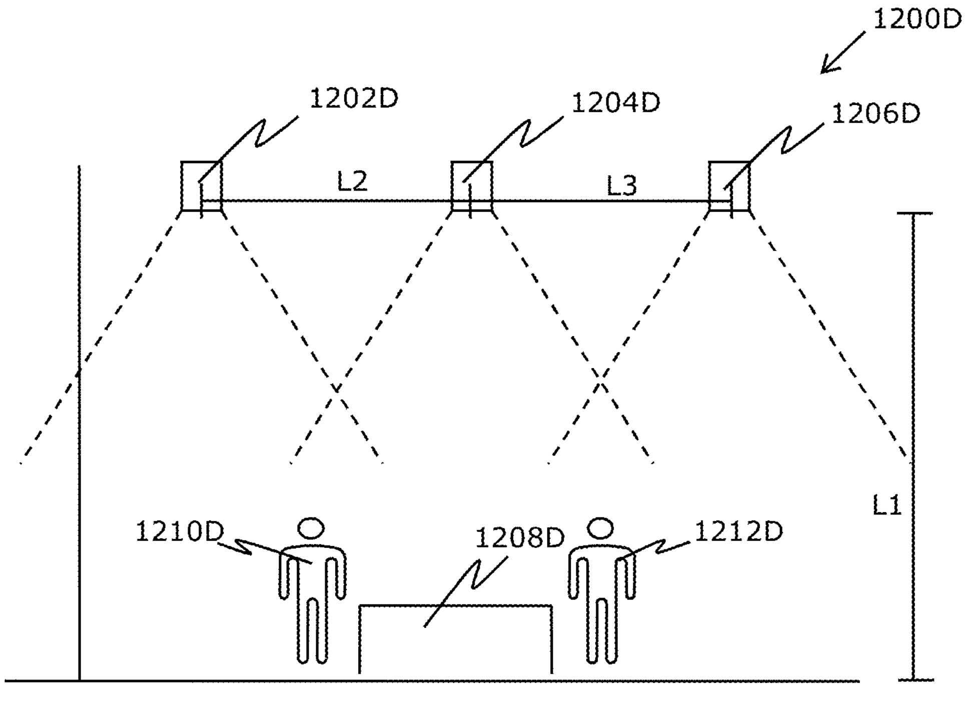

As illustrated in FIG. 12D, the lighting assembly 1200D comprises the light sources 1202D, 1204D and 1206D (such as the light sources of FIG. 1) that are arranged in a linear manner at a fixed elevation L1. Herein, the light sources 1202D and 1204D are spaced apart by a distance L2 and the light sources 1204D and 1206D are spaced apart by a distance L3. The distances L2 and L3 will depend on an area that is intended to be illuminated by the lighting assembly 1200D. In an example, the lighting assembly 1200D is installed in a workshop area. The light source 1204D generates a task lighting pattern to efficiently illuminate the workbench 1208D. Notably, the task lighting pattern to illuminate the workbench has a uniform glare rating under 19, thereby providing visual comfort to the workers 1210D and 1212B performing a task on the workbench 1208D. It will be appreciated that the light sources 1202D and 1206D are arranged on either side of the light source 1204D at the distance L2 and L3 to efficiently illuminate the remaining regions of the workshop area. The light sources 1202D, 1204D and 1206D are controlled by the controller (not shown) according to the requirements of the workers 1210D and 1212D.

Figure 12E:
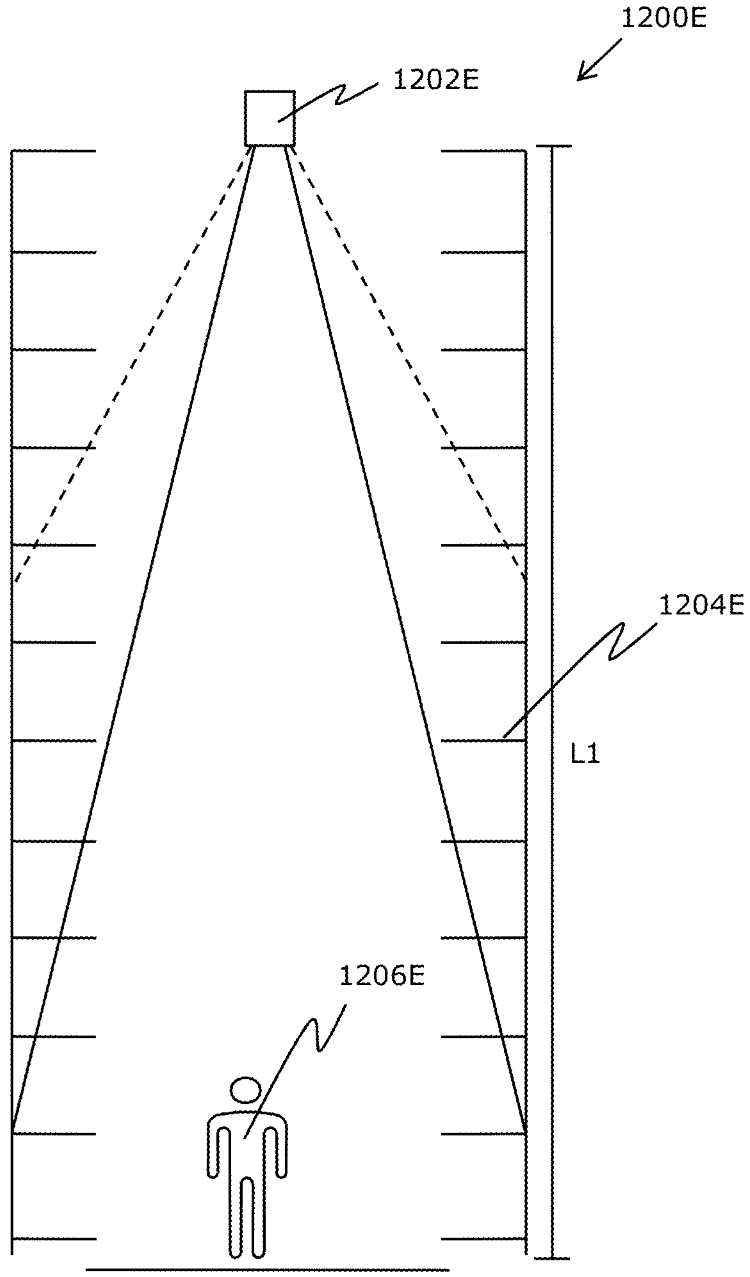

As illustrated in FIG. 12E, the lighting assembly 1200E comprises a light source 1202E (such as the light sources of FIG. 1) that is arranged at a fixed elevation L1 in order to illuminate shelf surface 1204E in a warehouse or the like. The light source 1202E generates a light distribution pattern to illuminate a portion of a shelf surface 1204E with less intensity and ground beneath thereof with relatively higher intensity for aiding a user. The light source 1202E can further be configured to switch between a first light distribution pattern and a second light distribution pattern to illuminate the portion of the shelf surface 1204E and ground beneath thereof, respectively, by using a controller (not shown), as required by the user 1206E.

Referring to FIG. 13, illustrated is a schematic representation of the arrangement 1300 comprising two or more light sources 1302 (such as the light source of FIG. 1) and the at least one optical element 1304 (such as the optical element of FIG. 1) arranged in a suspended ceiling 1306. Throughout the present disclosure, the term "suspended ceiling system" refers to any ceiling consisting of a ceiling grid suspended or hung at a height below a structural ceiling of architecture, such as a room of a house, or a building. Furthermore, the suspended ceiling system is supported by the hanging wires at a height to provide a gap between the structural ceiling and the suspended ceiling system. As shown the suspended ceiling system comprises T-bars 1308 suspended in the structural ceiling via the hanging wires. Furthermore, a ceiling panel 1310 is affixed to the T-bars 1308 with the aid of a supporting element providing a space 1312 above the ceiling panel 1310. The light source 1302 and the optical element 1304 are arranged in the space 1312 formed between the ceiling panel 1310 and the T-bar 1308. Optionally, the one or more lighting assemblies may be arranged in the suspended ceiling arrangement 1304. It will be appreciated that the variations in the structural and functional aspects of the embodiments of the lighting assembly, disclosed in FIGS. 2 to 12E of the disclosure may be arranged in the suspended ceiling system 1304. It will be appreciated that FIG. 13 is merely an example, which should not unduly limit the scope of the claims herein.

Referring to FIG. 14, illustrated is a system 1400 for providing different light distribution patterns in an environment, in accordance with an embodiment of the present disclosure. As illustrated, the system 1400 comprises a control device 1402 and one or more lighting assemblies 1404 (such as the lighting assembly of FIG. 1) in a communication network 1406. The control device 1402 is configured to define a light distribution pattern to be provided in the environment, and one or more lighting assemblies 1404 are configured to provide different light distribution patterns based on a control signal received from the control device 1402. Further, each of the one or more lighting assemblies 1404 comprises two or more light sources 1408 (such as the light sources of FIG. 1), wherein each of the two or more light sources 1408 is configured to emit a light beam, and wherein the two or more light sources 1408 are arranged in a manner so as to emit the respective light beams along channels different from each other. Further, each of the one or more lighting assemblies 1404 comprises at least one optical element 1410 arranged with respect to the two or more light sources 1408 to be disposed along the channels of the emitted light beams therefrom. The at least one optical element 1410 is configured to guide the emitted light beams on different optical paths to illuminate different targeted surfaces in the environment. Further, each of the one or more lighting assemblies 1404 comprises a controller 1412 operatively coupled to the two or more light sources 1408 and in communication with the control device 1402 to receive control signals therefrom. The controller 1412 is configured to independently control electrical potential supplied to the two or more light sources 1408 to regulate an intensity of the light beams emitted therefrom based on the received one or more control signals.

Throughout the present disclosure the term "control device" 1402 as used herein refers to any programmable or non-programmable device configured to generate control signals to generate and regulate the light distribution patterns of the one or more lighting assemblies 1404. The control device 1402 may be a wired device or a wireless device configured to generate control signals to control the one or more lighting assemblies. Further, the system 1400 may comprise a single control device 1402 serving as the central or master control for the system. Optionally, the system 1400 may comprise numerous control devices 1402 for controlling each of lighting assembly 1404 in the system. Furthermore, the control device 1402 is communicatively coupled to the one or more lighting assemblies via the communication network 1406 including, but not limited to, radio wave signaling, infrared frequency signaling and wireless fidelity within a network. It will be appreciated that the communication network 1406 can be an individual network, or a collection of individual networks that are interconnected with each other to function as a single large network. The communication network 1406 may be wired, wireless, or a combination thereof. Examples of the communication network 1406 include, but are not limited to, Local Area Networks (LANs), Wide Area Networks (WANs), Metropolitan Area Networks (MANs), Wireless LAN (WLANs), Wireless WANs (WWANs), Wireless MANs (WMANs), the Internet, radio networks, telecommunication networks, and Worldwide Interoperability for Microwave Access (WiMAX) networks. Generally, the term "internet" relates to any collection of networks using standard protocols. For example, the term includes a collection of interconnected (public and/or private) networks that are linked together by a set of standard protocols (such as TCP/IP, HTTP, and FTP) to form a global, distributed network. While this term is intended to refer to what is now commonly known as the Internet®, it is also intended to encompass variations that may be made in the future, including changes and additions to existing standard protocols or integration with other media (e.g., television, radio, etc.). The term is also intended to encompass non-public networks such as private (e.g., corporate) Intranets. Optionally, the the control device 1402 is communicatively coupled to the one or more lighting assemblies 1408 via one or more of wired connections such as power wiring, fiber optics, and the like. Optionally, the control device 1402 can be a manually operated device or an automatic device to control one or more lighting assemblies. In an example, the one or more lighting assemblies 1408 are controlled via the control device 1402 using a communication network 1406.

In an example, the control device 1402 is a remote-control device programmed to communicate wirelessly with the one or more lighting assemblies 1408 in an RF environment.

The remote-control device generates a control signal corresponding to a light distribution pattern, which is received by the controller 1412 of the one or more lighting assemblies 1408. Further, a light distribution pattern is generated based on the control signal. Optionally, the control device 1402 is provided with several controls such as one or more buttons to switch between various light distribution patterns, and/or to control various parameters of the selected light distribution pattern. In another example, the control device 1402 is a smart phone configured to be in communication with the one or more light sources. The smart phone is provided with the user interface having one or more controls to transit between various light distribution patterns and subsequently change a property thereof. In an example, the control device 1402 is configured to be operated in a manual mode or an automatic mode as required. Optionally, the control device 1402 may generate control signals to control the light distribution pattern of the one or more lighting assemblies 1408 based on a visual task being performed in the environment, a time of the day or a particular date. In an example, the control device 1402 may generate control signals to provide different light distribution patterns for reading, watching television, sleeping and the like. Optionally, the control device 1402 comprises a transmitter for transmitting the control signals. Notably, each of the aforementioned controllers 1412 in the one or more lighting assemblies comprises a receiver to receive the control signals transmitted by the control device 1402.

According to an embodiment the system 1400 further comprises an imaging sensor communicatively coupled to the control device 1402. The imaging sensor 1414 is configured to capture an image of the environment, process the image to acquire lighting intensity values for different targeted surfaces of the environment, and transmit the acquired lighting intensity values to the control device 1402. Throughout the present disclosure, the term "imaging sensor" as used herein refers to a device to capture an image of the environment, convert the image to a digital image, apply the image processing techniques known in the art to deduce various properties of the image, such as intensity, color, temperature and the like. Furthermore, the imaging sensor 1414 is configured to transmit the information to the control device 1402. The different types of imaging sensor 1414 include, but are not limited to, a camera, a photo sensor (for acquiring intensity values), or any other image sensing device.

According to an embodiment, the control device 1402 is configured to receive the acquired information pertaining to an image in the environment. Furthermore, the control device 1402 generates the one or more control signals based on the acquired lighting intensity values for different targeted surfaces of the environment. The control device 1402 may be configured to automatically generate one or more control signals to alter the light distribution patterns of the one or more assemblies 1408 based on the acquired intensity values for different targeted surfaces in the environment. Optionally, the control device 1402 operates in a closed loop system with the imaging sensor 1414 and automatically optimizes the one or more lighting assemblies 1408 based on the tasks performed in the environment. In an example, when the imaging sensor 1414 acquires an image of a person reading a book (as may be detected by using image recognition processing), the control device 1402 generates a signal to provide a light distribution pattern to correctly illuminate the area where the person is reading. Such a system 1400 will not only provide correct lighting to the environment, but also reduce wastage of energy. In another example, when the imaging sensor 1414 acquires an image of a person sleeping, the control device 1402 automatically generates a control signal to decrease the intensity of the light in the environment.

According to an embodiment, the control device 1402 comprises a display screen for presenting a user interface. The control device 1402 is configured to generate a lighting intensity map for the environment based on the light intensity values acquired by the imaging sensor 1414. Further, the control device 1402 is configured to display the generated lighting intensity map on the display screen. The term "lighting intensity map" as used herein refers to a digital image generated by applying false color image processing to the image captured by the imaging sensor 141. Each of the pixel in the digital image is mapped to a specific luminance value, say in Candela per meter square. The variations in the luminance values in the image are mapped to different colors to visually highlight variations in intensity in the environment so that the variations are easily perceivable by the human eye. Further, the control device 1402 is configured to receive one or more user inputs, via the user interface, to define the light distribution pattern for the environment. The user interface may display information persisting to the captured image of the environment, such as intensity values, spectrum values, temperature values and the like. Further, the user interface receives one or more user inputs on the displayed lighting intensity map to define the light distribution pattern for the environment. In an example, the user interface may provide the user to define a light distribution pattern based on the lighting intensity map and save the lighting intensity map to a memory associated with the control device 1402 for future retrieval. Furthermore, the user interface may also provide the user with an option to select between an automatic mode (i.e. control device 1402 automatically generates light distribution patterns based on a set of instructions) and a manual mode (i.e. control device 1402 receives inputs from the user to define a light distribution pattern). Furthermore, the user interface may provide the user with an option to select between various pre-configured light distribution patterns stored in the aforementioned memory associated with the controller. Moreover, the user interface may provide the user to regulate the parameters of a selected light distribution pattern.

The term "user interface (UI)" relates to a structured set of user interface elements rendered on a display screen. Optionally, the user interface (UI) rendered on the display screen is generated by any collection or set of instructions executable by an associated digital system. Additionally, the user interface (UI) is operable to interact with the user to convey graphical and/or textual information and receive input from the user. Specifically, the user interface (UI) used herein is a graphical user interface (GUI). Furthermore, the user interface (UI) elements refer to visual objects that have a size and position in user interface (UI). A user interface element may be visible, though there may be times when a user interface element is hidden. A user interface control is considered to be a user interface element. Text blocks, labels, text boxes, list boxes, lines, and images windows, dialog boxes, frames, panels, menus, buttons, icons, etc. are examples of user interface elements. In addition to size and position, a user interface element may have other properties, such as a margin, spacing, or the like.

Referring to FIG. 15, illustrated is a schematic representation of a system 1500 comprising a control device 1502 (such as the control device of FIG. 1) with the imaging sensor (not shown) integrated therein, a lighting assembly 1504 (such as the lighting assembly of FIG. 1) comprising three light sources 1506, 1508, and 1510 for providing light distribution patterns in an environment, in accordance with an embodiment of the present disclosure. In an example, the control device 1502 having an integrated imaging sensor is a smart phone device 1502. As shown, the imaging sensor integrated in the smart phone device 1502 captures an image of a hallway 1512, having a corridor with rows of shelves on either side. Further, the smart phone device 1502 captures intensity values associated with the image. The smart phone device 1502 applies false color image processing to the acquired image to generate the lighting intensity map 1514 which is displayed to the user on the display screen associated with the smart phone device 1502. The lighting intensity map 1514 highlights variations in intensity. In an example, the corridor is darker than the shelves; the user interface receives inputs from the user to increase the electrical potential of the light source 1508 thereby increasing the intensity of the light in the corridor to uniformly illuminate the hallway.

The present disclosure also relates to a computer implemented method for providing different light distribution patterns in an environment by implementing a lighting assembly. Various embodiments and variants disclosed above apply mutatis mutandis to the method.

Referring to FIG. 16, illustrated is a schematic representation of steps of a computer implemented method 1600 for providing different light distribution patterns in an environment, in accordance with an embodiment of the present disclosure. At step 1602, a lighting assembly (such as, the lighting assembly 100 of FIG. 1) is implemented. Herein, the lighting assembly comprises two or more light sources. Each of the two or more light sources is configured to emit a light beam, and wherein the two or more light sources are arranged in a manner so as to emit the respective light beams along channels different from each other, and at least one optical element arranged with respect to the two or more light sources to be disposed along the channels of the emitted light beams therefrom. The at least one optical element configured to guide the emitted light beams on different optical paths to illuminate different targeted surfaces in the environment. At step 1604, an image of the environment is captured. At step 1606, the image is processed to acquire lighting intensity values for different targeted surfaces of the environment. At step 1608, a light distribution pattern is defined for the environment based on the acquired lighting intensity values for different targeted surfaces of the environment. At step 1610, the electrical potential supplied to the two or more light sources is independently controlled to regulate an intensity of the light beams emitted therefrom based on the defined light distribution pattern.

As an alternative means of adjusting the allocation of electrical power among light source channels to regulate light distribution patterns in some embodiments, the electrical impedance within individual light source channels can be set by the inclusion of an impedance increasing component on the LED board. For example by the use of a resistor that is fixedly arranged into an electrical circuit on a LED board. A specific resistor can be selected at the time of LED board manufacture to provide a particular power allocation amount light source channels and subsequently, a specific light distribution. The proportional allocation of electrical power to individual light source channels can be achieved by making a light source channel a parallel electrical circuit and including a resistor in at least one of the parallel circuits to reduce current flow within that parallel branch.

Transmissive optical element-A transmissive optical element is comprised of a light transmissive material; for example glass, quartz, silicone, polymethyl methacrylate (acrylic), polycarbonate. Transmissive lenses in typical lighting assembly embodiments include lens features to adjust distribution of light from light channels and typically the lens features create at least one focal region within the lighting assembly. The specific geometry of a focal region is dependent on the particular lens design; for example, the focal region for spherical Fresnel lenses is a focal point. The focal region for cylindrical Fresnel lens is a focal line. Fresnel lens array.

Fresnel Lens-A Fresnel lens is a particular lens type well suited for use in lighting assembly embodiments. Fresnel lenses can be configured over a large range of size, scale, and shape. In some embodiments the surface of a transmissive lens is completely covered by a single Fresnel pattern while in other embodiments and array of smaller Fresnel patterns is used. Spherical, cylindrical, rectangular, and hexagonal are all commonly used geometric configurations.

Light source channel—Each light source channel comprises at least one light source. Light source channels of multiple light sources are typically arranged in a pattern; for example a linear array, a rectangular grid, a circular pattern, or a circular pattern of concentric rings. In order to achieve specific desired light distributions from the lighting assembly, multiple light source channels are positioned differently with respect to the focal region of lens features in the transmissive lens. Typically at least one light source channel is positioned outside of a focal region.

For clarity of explanation, FIG. 17 through FIG. 25 illustrate a variety of individual characteristics and features of novel lighting assemblies shown applied within linear light fixtures. It should be appreciated that the illustrated individual features can be combined in various embodiment lighting assemblies configured withing a wide variety of lighting fixtures.

FIG. 17 is a perspective view of a lighting assembly which includes a LED board 1702 with a linear array of LED light sources 1704 mounted inside a housing 1706. In this embodiment the optical element 1708 has surface features on the inner face of a light transmissive material, specifically an array of linear triangular prism features aligned in the same longitudinal direction as the LED Board. The optical element in this embodiment also has lens support structures 1710 to aid in mounting the lens within the housing. The housing 1706 encloses the assembly and holds components in positions. In some embodiments the optical element can be slid into the housing and held in place due to paired extruded geometry profiles. LED light sources 1704 emit light which propagates through the optical element 1708.

FIG. 18 is a cross-section view of a lighting assembly containing the similar elements of FIG. 18 but with an optical element 1808 comprising a Fresnel lens of with Fresnel lens axis 1814 and a lens support arm 1810. A LED Board 1802 contains a linear array of LEDs 1804. A housing 1806 serves to support and contain the lighting assembly. The optical element 1808 has linear Fresnel lens pattern extended longitudinally in the length of the fixture. The Fresnel lens axis 1814 is offset from the optical axis 1812 of the LED linear array at an angle $\alpha$ which cause a tilting of the optical axis of the light distribution exiting the lighting assembly. This tilted light output can be seen as angle $\beta$ in FIG. 19A which is a polar plot of the light distribution of the embodiment of FIG. 18. This type of angular offset is useful in certain illumination applications such as wall washing or wall grazing. FIGS. 19A and 19B also illustrates the effect of increasing upon light distribution of increasing the amount of light scattering diffusion within the optical element. As diffusion increases from FIG. 19A with 5% diffusion blend to FIG. 19B with 20% diffusion blend, the angular offset of the light output remains but the width of the beam output increases and the peak intensity decreases. For the embodiment of FIG. 18 and the corresponding plots of its light distribution in FIGS. 19A and 19B, the light scattering diffusion is provided by a blend within the optical element of light scattering microbeads of cross-linked PMMA acrylic of approximately 7 um diameter dispersed in a matrix of PMMA resin. The 5% diffusion of FIG. 19A is 5% concentration of cross-linked PMMA in amorphous PMMA resin and 20% diffusion of FIG. 19B is 20% concentration of cross-linked PMMA microbeads in amorphous PMMA resin. Critical to achieving a volumetric light scattering effect is a difference in refractive index between the matrix material and dispersed regions, in this case dispersed regions being microbeads. Microbeads of other optically transmissive materials can be substituted. Specific examples included but are not limited to silicone, COC, glass, and silica. PMMA is a popular choice for optical elements but other light transmissive materials such as polycarbonate, COC, silicone, glass, or quartz can be utilized. As an alternative or complementary means of providing light scattering, surface features such as lens features or surface texturing can be utilized.

FIG. 20 shows a cross-section view of lighting assembly embodiment in which the optical element 2008 merges two Fresnel lens patterns, both of which have their focal axes, 2014A and 2014B offset from the centerline of the fixture and optical axis 2012 of the linear LED array 2002 mounted on a LED board 2004. This offset is illustrated with angles α1 and α2 which produce two lobes in the polar plot light distribution as shown in FIG. 21. In this embodiment the lens is planar and mounts in the housing 2006 without extended lens support features. This more simple lens geometry is generally easier to manufacture and makes feasible a greater variety of manufacturing processes such as film and sheet casting or embossing, stamping, and injection molding. It can be applied to any other embodiments where desired.

FIG. 22 shows a lighting assembly embodiment in which the lens has a Fresnel lens pattern on the inner face aligned with the center line of the fixture housing 2206, the optical axis of the LED Board 2202, LED linear array 2204, and the focal axis 2212 of the Fresnel lens pattern on the optical element 2212. In this case the resultant light distribution is normal to the light fixture as seen in FIG. 23A. Optionally, a light scattering diffusion lens 2220 can be inserted into the lighting assembly as an auxiliary transmissive optical element to increase the beam width as shown in FIG. 23B. Additionally, the optional diffusion lens aids smoothing the beam pattern by reducing intensity spikes or color variation over angle.

FIG. 24A shows a lighting assembly embodiment in which the optical element 2408 has a Fresnel lens pattern on the inner face having a focal axis 2412 aligned with the center line of the optical axis of the LED linear array 2404 which is part of the LED board 2402, all held in place and enclosed by the housing 2406. A linear lenticular lens 2430 with lenticular features aligned in a transverse direction normal to the longitudinal direction of the linear Fresnel lens is positioned as an auxiliary transmissive optical element between the LED array 2404 and the optical element 2408. The resultant light distribution is plotted in the polar plot of FIG. 24B showing both transverse and longitudinal axes. The transverse axis light distribution 2401 across the width of the light fixture shows a very narrow beam pattern while the longitudinal axis light distribution 2403 shows a wider beam pattern due to spread by the lenticular lens 2430. In addition to providing the asymmetric beam pattern, the transverse lenticular pattern spreads the image of individual LED light sources longitudinally to provide a more smooth and uniform appearance. FIG. 24C is a photograph showing the improved uniformity appearance of the combined lenticular lens 2430 plus optical element 2408 vs. only optical element 2408 in obscuring the view of individual LED light sources 2402.

FIG. 25 is a cross-section view of a lighting assembly embodiment with three light source channels and a Fresnel lens. FIG. 25 shows a lighting assembly embodiment in which 3 LED boards, 2502A, 2502B, and 2502C each containing a respective linear array of LEDs 2504A, 2504B, and 2504C are aligned in parallel with each other and the length of the assembly and function as 3 independent light source channels, each with adjustable control of electrical power and light output. Each linear array of LEDs has a unique input angle α (α1, α2, α3) with respect to the center of the Fresnel lens pattern that results in a unique output axis β (β1, β2, β3). In this way, by controlling electrical power to individual LED boards, the output light distribution can be controlled to provide any combination of the 3 distinct light distributions; (β1, β2, β3). The center LED array 2504B, is aligned with the focal axis 2512B of the Fresnel lens pattern 2510 of the optical element 2508. This alignment produces an output pattern also aligned with the focal axis as notated by β2 showing zero beam pattern deflection. Typically in this type of configuration the distance from the LED light source 2502B to the Fresnel lens pattern 2510 would be the same or similar to the focal length of the Fresnel lens pattern so that the LED light source 2504B is in the focal region of the of the Fresnel Lens pattern. In this embodiment, the linear Fresnel lens pattern has a focal line aligned with the LED array 2504B. The other two light source channels having linear LED arrays 2502A and 2502C have respective optical axes 2512A and 2512C that are offset from the focal axis 2512B of the Fresnel lens pattern 2510. Light output from LED arrays 2502A and 2502C therefore input light into the Fresnel lens pattern 2510 at input angles α1 and α3 which result in tilted output angles β1 and β3 respectively.

FIG. 26A is a perspective of a round downlight suitable for mounting into a ceiling. A housing 2606 supports and contains the inner optical assembly. A front plate 2616 holds the optical element 2608 in place.

FIG. 26B is an exploded view of the round downlight embodiment of FIG. 26A. A LED board 2602 has an array of LEDs 2604 which contain at least two independent light source channels which are both electrically and physically independent. The LED array 2604 is mounted off-center in the fixture to enable a tilt beam light distribution. The reflector 2618 also enables a tilt beam light distribution due to its asymmetric shape. The optical element 2608 contains a circular Fresnel lens pattern and it is sealed between the housing 2606 and front plate 2616 with the aid of gaskets 2609A and 2609B. By adjusting the electrical power supplied to individual light source channels the amount of beam tilt can be adjusted.

FIG. 27A is an exploded view of a round downlight embodiment. The same lighting assembly embodiment is shown in FIG. 27B, FIG. 27C, and FIG. 27D. A LED board 2602 contains three light source channels, 2704A, 2704B, and 2704C, each comprising an array of LEDs that are both positioned physically separately and electrically independently controlled. LED array 2704A has a central cluster of one or more LEDs that are positioned at a the focal point of the Fresnel lens pattern of optical element 2708. LED array 2704B has an inner ring of LEDs that encircle the central cluster of LED array 2704A. LED array 2704C has an outer ring of LEDs that encircle the other two LED arrays. A reflector 2718 helps contain and guide light output form the LEDs to the optical element 2708. FIGS. 27B, 27C, and 27D each illustrate use of a specific light source channel. With the center LED array 2704A powered a narrow beam pattern is produced. With the inner ring LED array 2704B powered a medium beam pattern is produced. With the outer ring LED array 2704C powered a wide beam pattern is produced. By adjusting the proportion of electrical power to each of these three channels, the light distribution can be adjusted to meet specific desired beam patterns.

Modifications to embodiments of the present disclosure described in the foregoing are possible without departing from the scope of the present disclosure as defined by the accompanying claims. Expressions such as "including", "comprising", "incorporating", have ", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A lighting assembly for providing multiple adjustable light distribution patterns comprising;

a. at least first and second light source channels, each being both spatially separated and electrically controllable;

b. a controller for independently adjusting electrical power to each light source channel;

c. a primary transmissive optical element fixedly arranged with respect to a first light source channel and second light source channel such that;

i. light from the first light source channel is input into a first input face of the optical element, internally reflected within the optical element, and output from an adjacent face of the optical element which acts as an output face, ii. light input from the second light source channel is input into a second input face and emitted from the output face;

iii. light from each light source channel is redirected by the primary transmissive optical element and has a unique light distribution output upon exiting the output face; and means for proportionally allocating electrical power among light source channels to regulate light distribution patterns of the lighting assembly.

2. The lighting assembly of claim 1 wherein the primary transmissive optical element has one or more optical properties of refraction, reflection, diffraction or diffusion.

3. The lighting assembly of claim 1 wherein the lighting assembly and transmissive optical element are substantially linear.

4. The lighting assembly of claim 1 wherein the light source comprises an LED.

5. The lighting assembly of claim 1 wherein the two or more light source channels are connected to one or more LED drivers.

6. The lighting assembly of claim 1 wherein allocation of electrical power to each light source channel is selected by a wired or wireless connected control device.

7. The lighting assembly of claim 1 wherein allocation of electrical power to each light source channel is selected by a switch or button or dial.

8. The lighting assembly of claim 1 additionally comprising a memory device which stores electrical control settings for light distribution.

9. The lighting assembly of claim 1 wherein a configured lighting distribution has one or more lobes with a selectable width and peak intensity.

10. The lighting assembly of claim 1 wherein a configured light distribution comprises a single or multiple lobe input.

11. The lighting assembly of claim 1 wherein the primary transmissive optical element focuses or reduces beam width of at least one light source.

12. The lighting assembly of claim 1 additionally comprising one or more reflectors or reflective surfaces.

13. The lighting assembly of claim 1 wherein the primary transmissive optical element is substantially linear or elongated in shape.

14. The lighting assembly of claim 1 wherein light source channels are configured as a geometry selected from the following group; linear array, parallel rows, rectangular grid, circular pattern; and concentric rings.

15. The lighting assembly of claim 1 wherein the light distribution pattern of the lighting assembly is selected from a group including wall washing, cove lighting, task lighting, ambient lighting and accent lighting.

16. The lighting assembly of claim 1 wherein angular spread of the light distribution is controlled along an axis substantially perpendicular to one of the two or more light source channels.

17. The lighting assembly of claim 1 wherein two light source channels comprise differing spectrum, color, or color temperature.

18. The lighting assembly of claim 1 wherein the second input face of the primary transmissive optical element is adjacent to the output face and light from the second light source channel is internally reflected within the primary transmissive optical element.

19. The lighting assembly of claim 18 wherein with respect to both the first light source channel and the second light source channel the primary transmissive optical element is a light guide.

20. The lighting assembly of claim 1 wherein proportional allocation of electrical power to individual light source channels is achieved within a LED board having an electrical circuit including a component providing electrical impedance to reduce current flow through a specific light source channel.

21. The lighting assembly of claim 20 wherein the component providing electrical impedance is a resistor.

22. The lighting assembly of claim 1 wherein the primary transmissive optical element has at least one focal region.

23. The lighting assembly of claim 22 wherein the focal region comprises a focal point or focal line.

24. The lighting assembly of claim 1 further comprising an auxiliary transmissive optical element positioned sequentially in series before or after the primary transmissive optical element.

25. The lighting assembly of claim 24 wherein the auxiliary transmissive optical element is a lenticular or diffuser film or sheet.

26. The lighting assembly of claim 24 wherein the auxiliary transmissive optical element comprises lenticular features oriented substantially perpendicular to a Fresnel lens pattern in the primary light transmissive optical element.

27. The lighting assembly of claim 24 wherein visual brightness uniformity is increased as compared to a configuration without the auxiliary transmissive optical element.

28. The lighting assembly of claim 24 wherein the light distribution of the primary transmissive optical element is redirected in an asymmetric manner by the auxiliary transmissive optical element.

29. The lighting assembly of claim 1 wherein the input face of the second light source is an opposing face of the output face of the primary transmissive optical element.

30. The lighting assembly of claim 29 wherein with respect to the first light source channel the primary transmissive optical element is a light guide but with respect to the second light source channel the primary transmissive light source channel is not a light guide but rather a direct lit lens.

31. The lighting assembly of claim 29 further comprising a third light source spatially offset from the second light source and inputting into the same input face as the second light source.

32. The lighting assembly of claim 29 wherein the primary transmissive optical element is a light guide and light entering is total internal reflection before exiting from the output face.

33. The lighting assembly of claim 29 wherein the primary transmissive optical element further comprises at least one Fresnel lens pattern, each Fresnel lens pattern having a focal axis.

34. The lighting assembly of claim 29 wherein at least one light source channel is positioned outside a focal region.

35. The lighting assembly of claim 29 wherein at least one focal region is created by surface features in either the input face or output face of the primary light transmissive optical element.

* * * * *